US006420962B1

United States Patent
Matsumoto et al.

(10) Patent No.: US 6,420,962 B1
(45) Date of Patent: Jul. 16, 2002

(54) AUTOMATIC IDENTIFICATION LEVEL CONTROL CIRCUIT, IDENTIFICATION LEVEL CONTROL METHOD, AUTOMATIC IDENTIFICATION PHASE CONTROL CIRCUIT, IDENTIFICATION PHASE CONTROL METHOD, OPTICAL RECEIVER, AND OPTICAL COMMUNICATION SYSTEM

(75) Inventors: Yoshihiro Matsumoto; Takashi Kuriyama; Yoshinori Honma; Tsutomu Tajima; Masashi Tachigori; Toshibumi Kawano, all of Tokyo; Hirokazu Kobayashi, Miyagi; Masaki Shiraiwa, Miyagi; Kenzou Tan, Tokyo, all of (JP)

(73) Assignee: NEC Corporation, Tokyo (JP)

( * ) Notice: Subject to any disclaimer, the term of this patent is extended or adjusted under 35 U.S.C. 154(b) by 34 days.

(21) Appl. No.: 09/736,237

(22) Filed: Dec. 15, 2000

(30) Foreign Application Priority Data

Dec. 15, 1999 (JP) .......................................... 11-355687
Aug. 25, 2000 (JP) ........................................ 2000-255183

(51) Int. Cl.⁷ .............................................. G95B 1/00
(52) U.S. Cl. .................................................. 340/146.2
(58) Field of Search ..................................... 340/146.2

(56) References Cited

U.S. PATENT DOCUMENTS 5,760,937 A  *  6/1998  Ishikawa et al. ............ 359/135

FOREIGN PATENT DOCUMENTS

JP              8-265375          10/1996

* cited by examiner

*Primary Examiner*—Margaret R. Wambach
(74) *Attorney, Agent, or Firm*—McGinn & Gibb, PLLC

(57) ABSTRACT

The present invention provides an automatic identification level control circuit, an identification level control method, an automatic identification phase control circuit, an identification phase control method, and an optical receiver, capable of stably setting an optimal identification level or identification phase. An automatic identification level control circuit of the present invention includes a coupling capacitor, an identification circuit, a level fluctuation detection circuit, an identification voltage control circuit, and a low-pass filter. The identification circuit includes limiter amplifiers and flip flops. The level fluctuation detection circuit includes exclusive OR circuits.

33 Claims, 25 Drawing Sheets

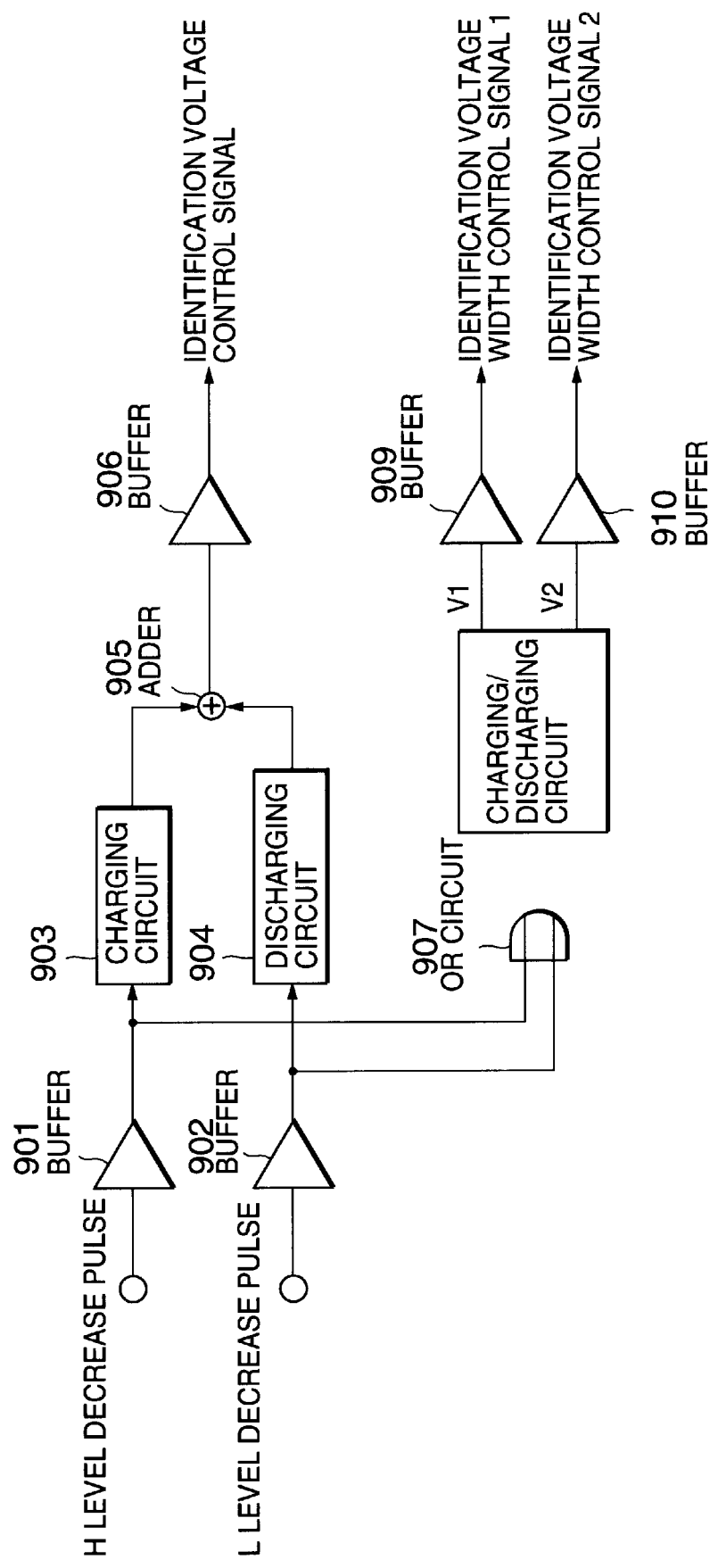

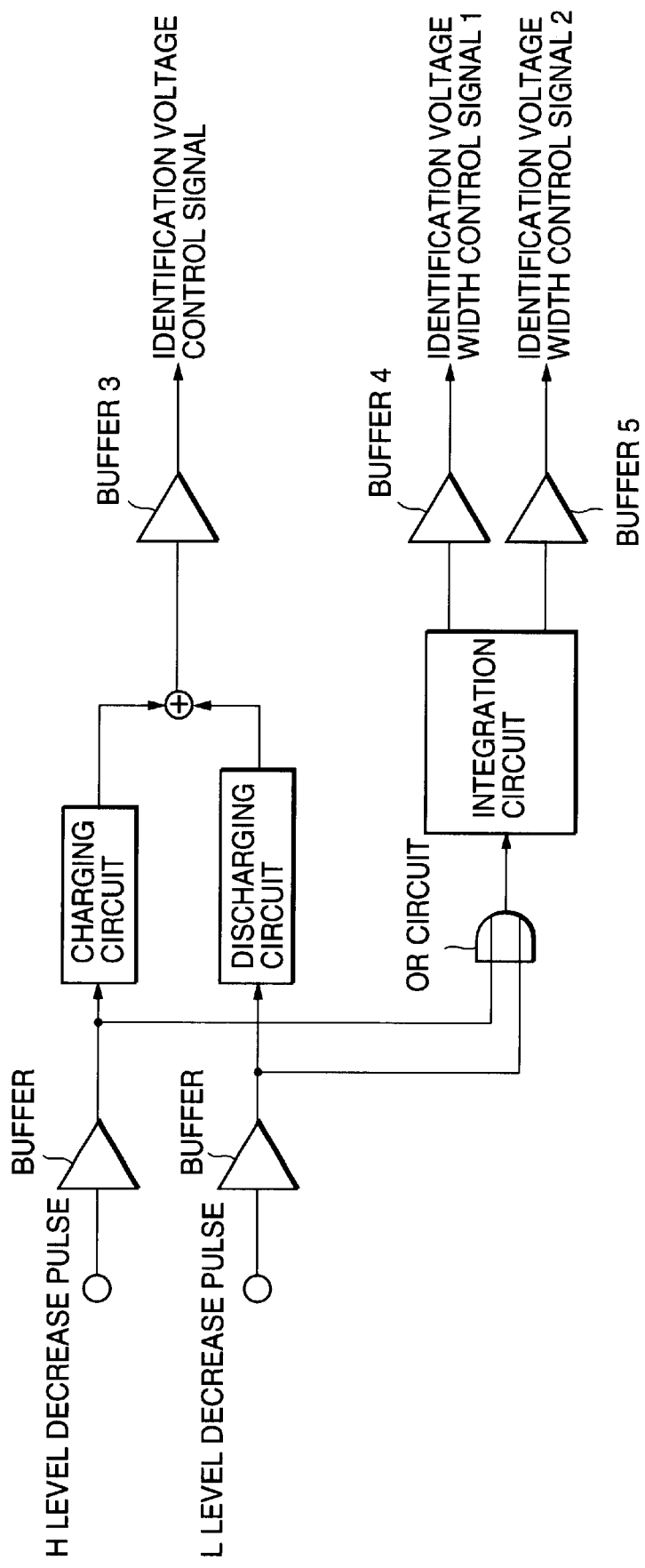

AUTOMATIC IDENTIFICATION LEVEL CONTROL CIRCUIT, IDENTIFICATION LEVEL CONTROL METHOD, AUTOMATIC IDENTIFICATION PHASE CONTROL CIRCUIT, IDENTIFICATION PHASE CONTROL METHOD, OPTICAL RECEIVER, AND OPTICAL COMMUNICATION SYSTEM

BACKGROUND OF THE INVENTION

1. Field of the Invention

The present invention relates to an automatic identification level control circuit, an identification level control method, an automatic identification phase control circuit, an identification phase control method, and an optical receiver. More particularly, the present invention relates to an automatic identification level control circuit, an identification level control method, an automatic identification phase control circuit, an identification phase control method, and an optical receiver, capable of automatically controlling an identification level or an identification timing according to an input signal.

2. Description of the Related Art

In a high-speed long-distance optical transmission, an optical signal is subject to a waveform distortion due to characteristics of a fiber (e.g., a band reduction, a non-linear effect). Therefore, the optimal position of the identification level for the optical signal is constantly changing. At present, however, since the identification level is fixed to a single point, the identification level is not set to the optimal identification level for various conditions. A resulting drawback is a narrow error margin which may limit the transmission distance.

In view of such a problem in the prior art, methods for controlling an identification level or an identification phase have been proposed in the art.

For example, Japanese Laid-Open Patent Publication No. 08-265375 discloses a method for controlling an identification level and a method for controlling an identification phase. In the method for controlling the identification level, a comparison is made between two output signals of adjacent levels among three output signals from three identifiers which receive a data input and have respectively different identification levels (i.e., low, intermediate and high levels). For example, the high level output signal is compared with respect to the intermediate level output signal. If the comparison result indicates a mismatch, the three identification levels are parallelly (i.e., with the intervals therebetween kept unchanged) shifted toward a direction opposite to the identification level used in the comparison (e.g., the high level). For example, if a result indicating a mismatch occurred between the intermediate level and the high level, the three identification levels are parallelly shifted to lower levels, respectively. In the method for controlling the identification phase disclosed in this laid-open patent publication, a comparison is made between two output signals of adjacent timings among three output signals from three identifiers which receive a data input and have respectively different identification timings (i.e., delayed, intermediate and advanced phases). For example, the advanced phase output signal is compared with respect to the intermediate phase output signal. If the comparison result indicates a mismatch, the three identification timings are parallelly shifted toward a direction opposite to the identification timing used in the comparison (e.g., the advanced phase). For example, if a result indicating a mismatch occurred between the intermediate phase and the advanced phase, the three identification timings are parallelly shifted to more delayed timings, respectively.

However, the above-described conventional method has the following problems.

In the method for controlling an identification level or an identification phase described in Japanese Laid-Open Patent Publication No. 08-265375, supra, although all of the three identification levels or identification timings used for the control are parallelly shifted, the intervals therebetween are fixed. Therefore, the control system may be instable when the difference between high and low levels of the incoming signal decreases. Specifically, when the high identification level of the three identification levels is optimized, the low identification level may become less than the low level of the signal, resulting in a "mismatch" result from a comparison with respect to the output of the identifier of the intermediate identification level. Then, if the low identification level is optimized, the high identification level deviates from the optimal value. Therefore, the control system as a whole may not reach a stable state, whereby even an oscillation may occur.

An object of the present invention is to solve the above-described problem by providing an automatic identification level control circuit, an identification level control method, an automatic identification phase control circuit, an identification phase control method, and an optical receiver, capable of stably setting an identification level or an identification phase.

SUMMARY OF THE INVENTION

In order to achieve the above-described object, an automatic identification level control circuit of the present invention comprises: a plurality of identification circuits receiving an input data signal and having identification levels different from one another; a plurality of exclusive OR circuits each outputting a match determination signal indicating "match" or "mismatch" between outputs from the identification circuits which respectively correspond to two identification levels adjacent to each other in terms of magnitude among the identification levels different from one another; and an identification voltage control circuit for outputting a control signal for adjusting respective absolute values of the identification levels different from one another and an interval therebetween so that the match determination signal indicates "match".

An automatic identification level control circuit of the present invention may comprise: a plurality of identification circuits receiving an input data signal and having identification levels different from one another; a plurality of exclusive OR circuits each outputting a match determination signal indicating "match" or "mismatch" between outputs from the identification circuits which respectively correspond to two identification levels adjacent to each other in terms of magnitude among the identification levels different from one another; and an identification voltage control circuit for outputting a control signal for adjusting a difference between a DC level of the input data signal and one of the identification levels different from one another, and each of the other identification levels so that the match determination signal indicates "match".

The identification voltage control circuit may comprise: a charging circuit whose output voltage is incremented when a first one of the match determination signals corresponding to a first one of the identification levels indicates "mismatch"; a discharging circuit whose output voltage is decremented when a second one of the match determination signals corresponding to a second one of the identification levels which is less than the first identification level indicates "mismatch"; and a charging/discharging circuit having a first output whose voltage rapidly decreases when at least one of the first and second match determination signals indicates "mismatch" and gradually increases when both of the first and second match determination signals indicate "match", and a second output whose voltage rapidly increases when at least one of the match determination signals indicates "mismatch" and gradually decreases when both of the match determination signals indicate "match".

The identification voltage control circuit may comprise: a discharging circuit whose output voltage is decremented when a first one of the match determination signals corresponding to a first one of the identification levels indicates "mismatch"; a charging circuit whose output voltage is incremented when a second one of the match determination signals corresponding to a second one of the identification levels which is less than the first identification level indicates "mismatch"; and a charging/discharging circuit having a first output whose voltage rapidly decreases when at least one of the first and second match determination signals indicates "mismatch" and gradually increases when both of the first and second match determination signals indicate "match", and a second output whose voltage rapidly increases when at least one of the match determination signals indicates "mismatch" and gradually decreases when both of the match determination signals indicate "match".

The identification voltage control circuit may comprise: a first up/down counter which counts up when a first one of the match determination signals corresponding to a first one of the identification levels indicates "mismatch" and counts down when a second one of the match determination signals corresponding to a second one of the identification levels which is less than the first identification level indicates "mismatch"; a timer for providing a predetermined timing; a second up/down counter which counts down when at least one of the first and second match determination signals indicates "mismatch" and counts up in accordance with the predetermined timing provided by the timer; and a third up/down counter which counts up when at least one of the first and second match determination signals indicates "mismatch" and counts down in accordance with the predetermined timing provided by the timer.

The identification voltage control circuit may comprise: a first up/down counter which counts down when a first one of the match determination signals corresponding to a first one of the identification levels indicates "mismatch" and counts up when a second one of the match determination signals corresponding to a second one of the identification levels which is less than the first identification level indicates "mismatch"; a timer for providing a predetermined timing; a second up/down counter which counts down when at least one of the first and second match determination signals indicates "mismatch" and counts up in accordance with the predetermined timing provided by the timer; and a third up/down counter which counts up when at least one of the first and second match determination signals indicates "mismatch" and counts down in accordance with the predetermined timing provided by the timer.

The identification voltage control circuit may comprise: a discharging circuit whose output voltage is decremented when a first one of the match determination signals corresponding to a first one of the identification levels indicates "mismatch"; and a charging circuit whose output voltage is incremented when a second one of the match determination signals corresponding to a second one of the identification levels which is less than the first identification level indicates "mismatch".

An average value between identification levels which respectively have a maximum value and a minimum value among the identification levels different from one another may be included as an identification level.

The automatic identification level control circuit may further comprise: a pulse width elongation circuit which is inserted between each of the plurality of exclusive OR circuits and the identification voltage control circuit for elongating the match determination signal.

An automatic identification phase control circuit of the present invention comprises: a plurality of identification circuits receiving an input data signal and having identification timings different from one another; a plurality of exclusive OR circuits each outputting a match determination signal indicating "match" or "mismatch" between outputs from the identification circuits which respectively correspond to two identification timings adjacent to each other in terms of delay amount among the identification timings different from one another; and an identification timing control circuit for outputting a control signal for adjusting respective ones of the identification timings different from one another so that the match determination signal indicates "match".

The identification timing control circuit may comprise: a discharging circuit whose output voltage is decremented when a first one of the match determination signals corresponding to a first one of the identification timings indicates "mismatch"; a charging circuit whose output voltage is incremented when a second one of the match determination signals corresponding to a second one of the identification timings which is delayed with respect to the first identification timing indicates "mismatch"; and a charging/discharging circuit having a first output whose voltage rapidly decreases when at least one of the first and second match determination signals indicates "mismatch" and gradually increases when both of the match determination signals indicate "match", and a second output whose voltage rapidly increases when at least one of the match determination signals indicates "mismatch" and gradually decreases when both of the match determination signals indicate "match".

The identification timing control circuit may comprise: a first up/down counter which counts down when a first one of the match determination signals corresponding to a first one of the identification timings indicates "mismatch" and counts up when a second one of the match determination signals corresponding to a second one of the identification timings which is delayed with respect to the first identification timing indicates "mismatch"; a timer for providing a predetermined timing; a second up/down counter which counts down when at least one of the first and second match determination signals indicates "mismatch" and counts up in accordance with the predetermined timing provided by the timer; and a third up/down counter which counts up when at least one of the first and second match determination signals indicates "mismatch" and counts down in accordance with the predetermined timing provided by the timer.

The identification timing control circuit may comprise: a discharging circuit whose output voltage is decremented when a first one of the match determination signals corresponding to a first one of the identification timings indicates "mismatch"; and a charging circuit whose output voltage is incremented when a second one of the match determination signals corresponding to a second one of the identification timings which is delayed with respect to the first identification timing indicates "mismatch".

An average value between identification timings which respectively have a maximum delay amount and a minimum delay amount among the identification timings different from one another may be included as an identification timing.

The automatic identification phase control circuit may further comprise: a pulse width elongation circuit which is inserted between each of the plurality of exclusive OR circuits and the identification timing control circuit for elongating the match determination signal.

An identification level control method of the present invention comprises: an identification step of making a comparison in magnitude between an input data signal and each of a plurality of identification levels different from one another; a comparison step of making a comparison between comparison results from the identification step which respectively correspond to two of the identification levels different from one another, thereby giving a determination result of "match" or "mismatch"; and an identification voltage adjustment step of adjusting respective absolute values of the identification levels and an interval therebetween based on the determination result given in the comparison step.

The number of the identification levels may be three.

The identification voltage adjustment step may comprise: an identification level position adjustment step of shifting, by a same level, respective ones of the plurality of identification levels; and an identification level interval adjustment step of adjusting an interval between each pair of the plurality of identification levels.

The identification voltage adjustment step may comprise: an extreme identification level adjustment step of independently adjusting identification levels which respectively have a maximum value and a minimum value among the plurality of identification levels; and an intermediate identification level setting step of setting a value of each remaining identification level to a value which divides, at a predetermined division ratio, a voltage level range between the identification levels which respectively have the maximum value and the minimum value.

The identification level control method may further comprise: an interval widening step of gradually widening a difference between identification levels which respectively have a maximum value and a minimum value among the identification levels during a time period in which the comparison step is giving a determination result of "match".

The identification level control method may comprise: an identification step of producing an identification output obtained by making a comparison in magnitude between an input digital signal and a predetermined identification level; an error detection step of detecting an error in a code string which forms the identification output; and an identification level changing step of increasing the identification level when a low level is erroneously identified as a high level, and decreasing the identification level when a high level is erroneously identified as a low level.

An identification phase control method of the present invention comprises: an identification step of producing a plurality of identification outputs each obtained by making a comparison in magnitude between an input digital signal and a predetermined identification level with a respective one of a plurality of identification timings different from one another; a comparison step of making a comparison between identification outputs from the identification step which respectively correspond to two of the plurality of identification timings, thereby giving a determination result of "match" or "mismatch"; and an identification timing adjustment step of adjusting the identification timings based on the determination result given in the comparison step.

The identification timing adjustment step may comprise: an identification timing position adjustment step of shifting, by a same level, respective ones of the plurality of identification timings; and an identification timing interval adjustment step of adjusting an interval between each pair of the plurality of identification timings.

The identification timing adjustment step may comprise: an extreme identification timing adjustment step of independently adjusting identification timings which respectively have a maximum delay amount and a minimum delay amount among the plurality of identification timings; and an intermediate identification timing setting step of setting a value of each remaining identification timing to a value which divides, at a predetermined division ratio, an identification timing range between the identification timings which respectively have the maximum delay amount and the minimum delay amount.

The identification phase control method further may comprise: an interval widening step of gradually widening a difference in delay amount between identification timings which respectively have a maximum delay amount and a minimum delay amount among the identification timings during a time period in which the comparison step is giving a determination result of "match".

An optical receiver of the present invention comprises: a photodetector for converting an input optical signal into an electric signal; an automatic identification level control circuit as described above which receives the electric signal; and a clock extraction circuit for extracting and outputting a clock signal contained in the electric signal, and providing the extracted clock signal to the automatic identification level control circuit.

The optical receiver may further comprise: an identifier for receiving the electric signal and identifying the received electric signal based on one of the plurality of identification levels which has a value in a vicinity of a median among the plurality of identification levels, and a timing of the clock signal.

The optical receiver may further comprise: a capacitor inserted between the photodetector and the identifier.

The optical receiver may further comprise: an identification phase control circuit as described above, wherein the electric signal is input to the identification phase control circuit, one of the plurality of identification timings which has a delay amount in a vicinity of a median among the plurality of identification timings is provided to the automatic identification level control circuit, and one of the plurality of identification levels which has a value in a vicinity of a median among the plurality of identification levels is provided to the automatic identification phase control circuit.

BRIEF DESCRIPTION OF THE DRAWINGS

FIG. 9 is a diagram illustrating a structure of an identification voltage control circuit 103 according to one embodiment of the present invention;

FIG. 10 is a diagram illustrating a structure of an identification voltage control circuit 203 according to one embodiment of the present invention;

DESCRIPTION OF THE PREFERRED EMBODIMENTS

The structure and operation of an automatic identification level control circuit, an identification level control method, an automatic identification phase control circuit, an identification phase control method, and an optical receiver according to the present invention will be described with reference to FIGS. 1 to 23.

Embodiment 1

Figure 1:
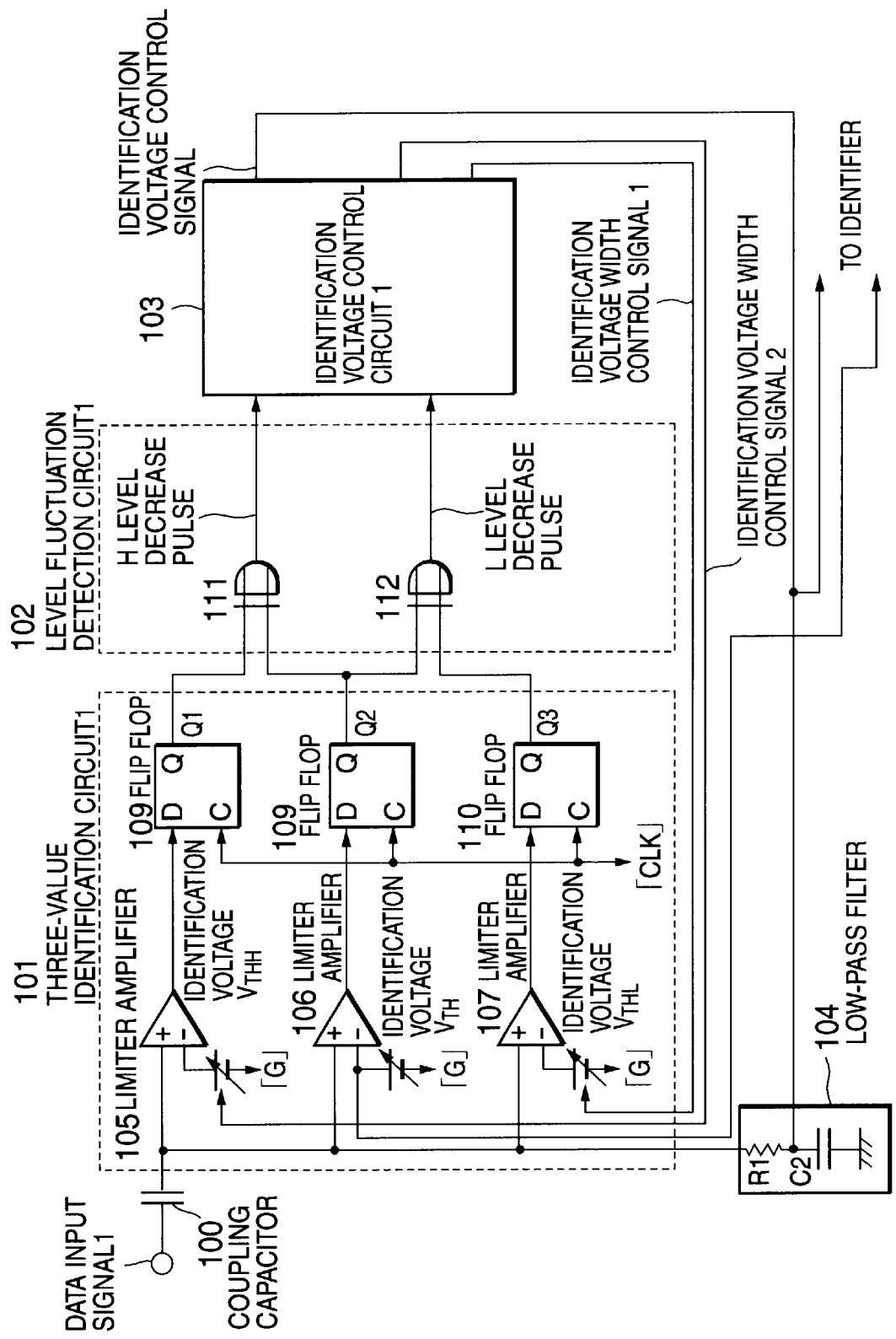
FIG. 1 is a diagram illustrating a structure of an automatic identification level control circuit 1000 according to one embodiment of the present invention.

FIG. 1 is a diagram illustrating a structure of an automatic identification level control circuit 1000 according to the first embodiment of the present invention. Referring to FIG. 1, the automatic identification level control circuit 1000 includes a coupling capacitor 100, a three-value identification circuit 101, a level fluctuation detection circuit 102, an identification voltage control circuit 103, and a low-pass filter 104. The three-value identification circuit 101 includes limiter amplifiers 105 to 107, and flip flops 108 to 110. The level fluctuation detection circuit 102 includes exclusive OR circuits 111 and 112.

The coupling capacitor 100 cuts off a DC component of a data input signal 1 so as to pass only the signal component therethrough. The three-value identification circuit 101 has identification points respectively in the vicinity of the H level, the median level and the L level of the data input signal 1, and outputs identification results Q1, Q2 and Q3 which have been obtained by using the H level, the median level and the L level, respectively. The level fluctuation detection circuit 102 makes a comparison between the H level identification result Q1 and the median level identification result Q2 from the three-value identification circuit 101, and between the median level identification result Q2 and the L level identification result Q3, so as to detect a decrease in the H level or an increase in the L level and output an H level decrease pulse and an L level increase pulse. The identification voltage control circuit 103 outputs an identification voltage control signal such that when the H level decrease pulse is received, the respective non-inverted terminal bias voltages of the limiter amplifiers 105 to 107 are simultaneously increased, whereas when the L level increase pulse is received, the respective non-inverted terminal bias voltages of the limiter amplifiers 105 to 107 are simultaneously decreased. The identification voltage control circuit 103 also outputs an identification voltage width control signal 1, which provides a control such that when the H level decrease pulse or the L level increase pulse is received, the identification voltage VTHH of the limiter amplifier 105 is rapidly decreased, thereby narrowing the interval between VTHH and VTH, and when the H level decrease pulse or the L level increase pulse is no longer received, the identification voltage VTHH is gradually increased, thereby slowly widening the interval between VTHH and VTH. The identification voltage control circuit 103 further outputs an identification voltage width control signal 2, which provides a control such that when the H level decrease pulse or the L level increase pulse is received, the identification voltage VTHL of the limiter amplifier 107 is rapidly increased, thereby narrowing the interval between VTH and VTHL, and when the H level decrease pulse or the L level increase pulse is no longer received, the identification voltage VTHL is gradually decreased, thereby slowly widening the interval between VTH and VTHL. In this case, the interval between VTH and VTHL and the interval between VTHH and VTH are not necessarily equal. The low-pass filter 104 is connected between the inverted terminals of the limiter amplifiers 105 to 107 and the identification voltage control signal from the identification voltage control circuit 103 so as to remove the signal component.

As mentioned above, the three-value identification circuit 101 includes the limiter amplifier 105, the limiter amplifier 106, the limiter amplifier 107, the flip flop 108, the flip flop 109, and the flip flop 110.

The limiter amplifier 105 receives at its non-inverted input terminal the output from the capacitor 100, and compares the output from the capacitor 100 with the identification voltage VTHH. Similarly, the limiter amplifier 106 receives at its non-inverted input terminal the output from the capacitor 100, and compares the output from the capacitor 100 with the identification voltage VTH. Similarly, the limiter amplifier 107 receives at its non-inverted input terminal the output from the capacitor 100, and compares the output from the capacitor 100 with the identification voltage VTHL. The flip flop 108 receives at its data input terminal (D) the output signal from the limiter amplifier 105, and outputs data which is in synchronism with a clock signal (CLK). The flip flop 109 receives at its data input terminal (D) the output signal from the limiter amplifier 106, and outputs data which is in synchronism with the clock signal (CLK). The flip flop 110 receives at its data input terminal (D) the output signal from the limiter amplifier 107, and outputs data which is in synchronism with the clock signal (CLK).

As mentioned above, the level fluctuation detection circuit 102 includes the exclusive OR circuit 111 and the exclusive OR circuit 112. The exclusive OR circuit 111 receives at its two input terminals the output signals from the flip flop 108 and the flip flop 109, respectively, and detects a match/mismatch therebetween. The exclusive OR circuit 112 receives at its two input terminals the output signals from the flip flop 109 and the flip flop 110, respectively, and detects a match/mismatch therebetween.

Referring to FIG. 9, the identification voltage control circuit 103 includes a buffer 901, a charging circuit 903, a buffer 902, a discharging circuit 904, an adder 905, a buffer 906, an OR circuit 907, a charging/discharging circuit 908, a buffer 909, and a buffer 910.

The buffer 901 receives the H level decrease pulse from the exclusive OR circuit 111. The output voltage from the charging circuit 903 increases each time the H level decrease pulse is received. The buffer 902 receives the L level increase pulse from the exclusive OR circuit 112. The output voltage from the discharging circuit 904 decreases as the number of L level increase pulses received increases. The adder 905 adds together the respective voltages from the charging circuit 903 and the discharging circuit 904. The buffer 906 receives the voltage from the voltage addition means, and outputs the received voltage as the identification voltage control signal. The OR circuit 907 produces the logical sum of the respective outputs from the buffer 901 and the buffer 902. The charging/discharging circuit 908 has a circuit which is rapidly charged when there is an input from the OR circuit 907 and gradually discharged when there is no longer an input from the OR circuit 907. The charging/discharging circuit 908 has an output V1 whose voltage is rapidly decreased when there is an input from the OR circuit 907 and gradually increased when there is no longer an input from the OR circuit 907, and another output V2 whose voltage is rapidly increased when there is an input from the OR circuit 907 and gradually decreased when there is no longer an input from the OR circuit 907. The buffer 909 receives the output V1 from the charging/discharging circuit 908, and outputs the identification voltage width control signal 1. The buffer 910 receives the output V2 from the charging/discharging circuit 908, and outputs the identification voltage width control signal 2. In this case, the interval between the identification voltage control signal and the identification voltage width control signal 1 and the interval between the identification voltage control signal and the identification voltage width control signal 2 are not necessarily equal.

The buffers 901, 902, 909 and 910 may be omitted if there is no possibility of noise creeping. While a well-known low-pass filter configuration including a resistor R and a capacitor C is used for the low-pass filter 104, the low-pass filter 104 is not limited to this configuration.

Next, the operation of the automatic identification level control circuit 1000 will be described with reference to FIGS. 1, 7 and 9.

Referring to FIG. 1, the data input signal 1 is provided to the three-value identification circuit 101 via the coupling capacitor 100.

Figures 7A, 7B:
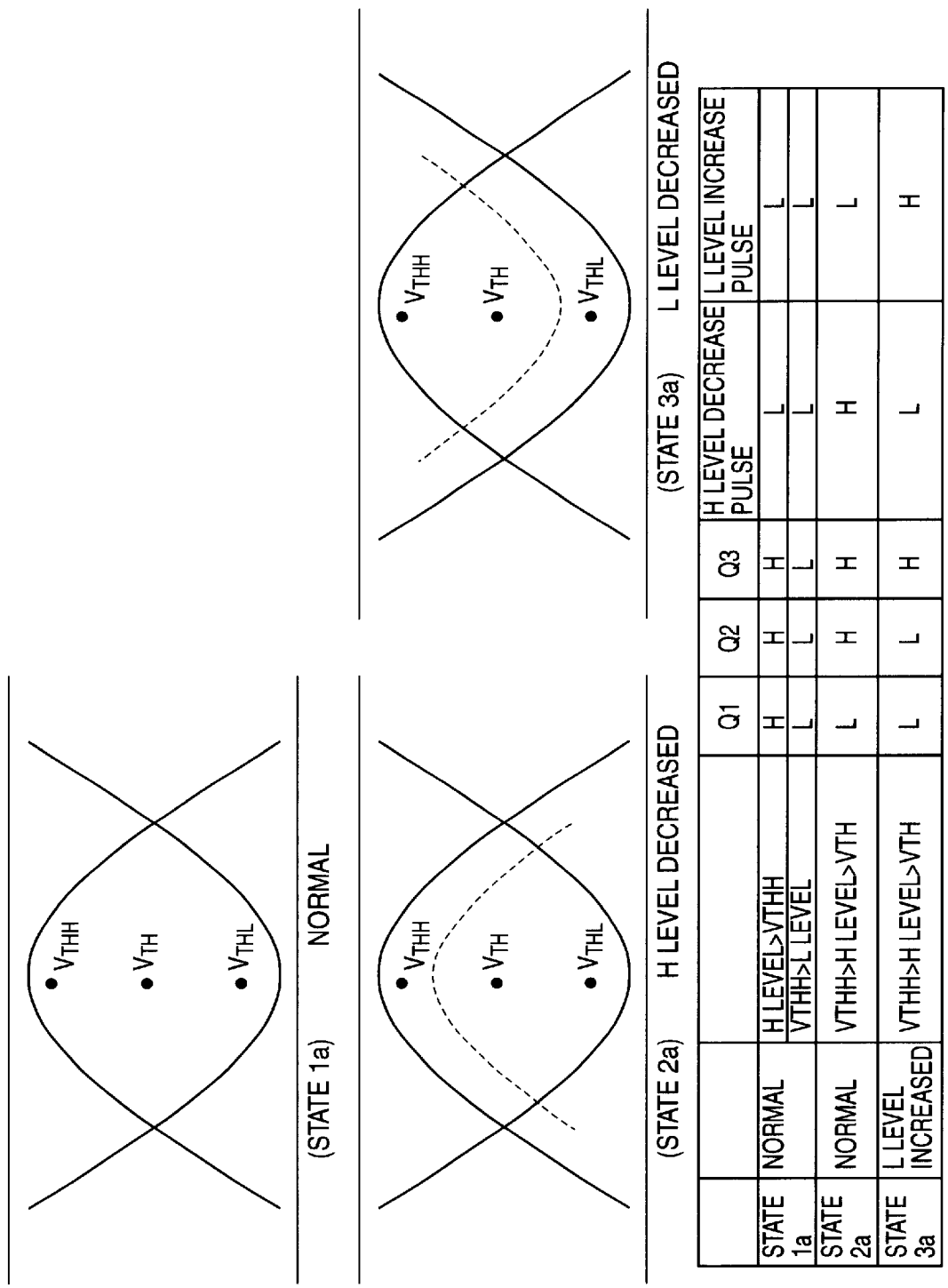
FIGS. 7A and 7B illustrate the operation of one embodiment of the present invention.

In a normal state, the identification voltage VTHH, the identification voltage VTH, the identification voltage VTHL, and the data input signal 1 are in a relationship as shown in State 1*a* of FIG. 7A with respect to one another. Specifically, the H level of the data is above the identification voltage VTHH, and the L level of the data is below the identification voltage VTHL. In this state, the respective outputs from the limiter amplifiers 105 to 107 illustrated in FIG. 1 are all at the H level. As a result, as shown in "Table illustrating operation of three-value identification circuit and level fluctuation detection circuit" of FIG. 7B, the respective outputs Q1 to Q3 from the flip flops 108 to 110 illustrated in FIG. 1 are also all at the H level, whereby the respective outputs from the exclusive OR circuit 111 and the exclusive OR circuit 112 are both at the L level.

Similarly, where the L level of the data is below the identification voltage VTHL, the respective outputs from the limiter amplifiers 105 to 107 illustrated in FIG. 1 are all at the L level. As a result, as shown in "Table illustrating operation of three-value identification circuit and level fluctuation detection circuit", the respective outputs Q1 to Q3 from the flip flops 108 to 110 are also all at the L level, whereby the respective outputs from the exclusive OR circuit 111 and the exclusive OR circuit 112 are both at the L level.

If, as shown in State 2*a* of FIG. 7A, the H level of the data input signal 1 decreases to a level between the identification voltage VTHH and the identification voltage VTH, the output from the limiter amplifier 105 illustrated in FIG. 1 is at the L level while the respective outputs from the limiter amplifiers 106 and 107 are at the H level. As a result, as shown in FIG. 7B, the output Q1 from the flip flop 108 is at the L level while the respective outputs Q2 and Q3 from the flip flops 109 and 110 are at the H level, whereby the output from the exclusive OR circuit 111 is at the H level while the output from the exclusive OR circuit 112 is at the L level.

Conversely, if, as shown in State 3*a*, the L level of the data input signal 1 increases to a level between the identification voltage VTH and the identification voltage VTHL, the respective outputs from the limiter amplifiers 105 and 106 illustrated in FIG. 1 are at the L level while the output from the limiter amplifier 107 is at the H level. As shown in "Table illustrating operation of three-value identification circuit and level fluctuation detection circuit", the respective outputs Q1 and Q2 from the flip flops 108 and 109 are at the L level while the output Q3 from the flip flop 110 is at the H level, whereby the output from the exclusive OR circuit 111 is at the L level while the output from the exclusive OR circuit 112 is at the H level.

Next, the operation of the identification voltage control circuit 103 will be described with reference to FIG. 9. The H level decrease pulse from the level fluctuation detection circuit 102 is first provided to the buffer 901. The buffer 901 is inserted for the purpose of preventing noise creeping, and the like, from the surrounding circuits, etc. The charging circuit 903 is a type of integration circuit whose output voltage increases each time the H level decrease pulse is received and decreases when the H level decrease pulse is no longer received.

As the buffer 901, the buffer 902 receiving the L level increase pulse is inserted for the purpose of preventing noise creeping, and the like. The discharging circuit 904 is also a type of integration circuit whose output voltage decreases each time the L level increase pulse is received and increases when the L level increase pulse is no longer received.

The respective outputs from the charging circuit 903 and the discharging circuit 904 are added together. When the number of H level decrease pulses is larger than the number of L level increase pulses, the resulting identification voltage control signal increases. Conversely, when the number of H level decrease pulses is smaller than the number of L level increase pulses, the resulting identification voltage control signal decreases. Specifically, when the number of H level decrease pulses is larger than the number of L level increase pulses, the identification voltages VTHH, VTH and VTHL are shifted downwardly from State 2a so as to restore the normal relationship as shown in State 1a. When the number of H level decrease pulses is smaller than the number of L level increase pulses, the identification voltages VTHH, VTH and VTHL are shifted upwardly from State 3a so as to restore the normal relationship as shown in State 1a.

When the identification voltages VTHH, VTH and VTHL are shifted downwardly from State 2a, the identification voltage VTHL may be positioned below the L level if the amplitude of the data input signal has been reduced. In such a case, the intervals between VTHH, VTH and VTHL should be narrowed in order to ensure the normal relationship as shown in State 1a.

Such an interval control operation will be described with reference to FIG. 9.

The logical sum of the H level decrease pulse and the L level increase pulse is produced in the OR circuit 907. The charging/discharging circuit 908 is a type of peak value detection circuit, and the operation thereof is such that it is rapidly charged when either pulse is received and gradually discharged when either pulse is no longer received (or vice versa). The charging/discharging circuit 908 has the output V1 whose voltage is rapidly decreased when a pulse is received and gradually increased when a pulse is no longer received, and another output V2 whose voltage is rapidly increased when a pulse is received and gradually decreased when a pulse is no longer received. Therefore, when either the H level decrease pulse or the L level increase pulse is received, the output V1 provides the identification voltage width control signal 1 via the buffer 909 so as to rapidly decrease the identification voltage VTHH of the limiter amplifier 105.

When either the H level decrease pulse or the L level increase pulse is received, the output V2 provides the identification voltage width control signal 2 via the buffer 910 so as to rapidly increase the identification voltage VTHL of the limiter amplifier 107.

Thus, the interval between the identification voltage VTHH and the identification voltage VTH and the interval between the identification voltage VTH and the identification voltage VTHL can be narrowed when either the H level decrease pulse or the L level increase pulse is received. As a result, even when the amplitude of the data input signal has been reduced, it is possible to ensure the normal relationship as shown in State 1a among VTHH, VTH and VTHL.

The buffers 906, 909 and 910 are inserted for the purpose of preventing noise creeping, and act as a type of voltage follower. These buffers can be omitted if there is no noise creeping.

Embodiment 2

Figure 2:
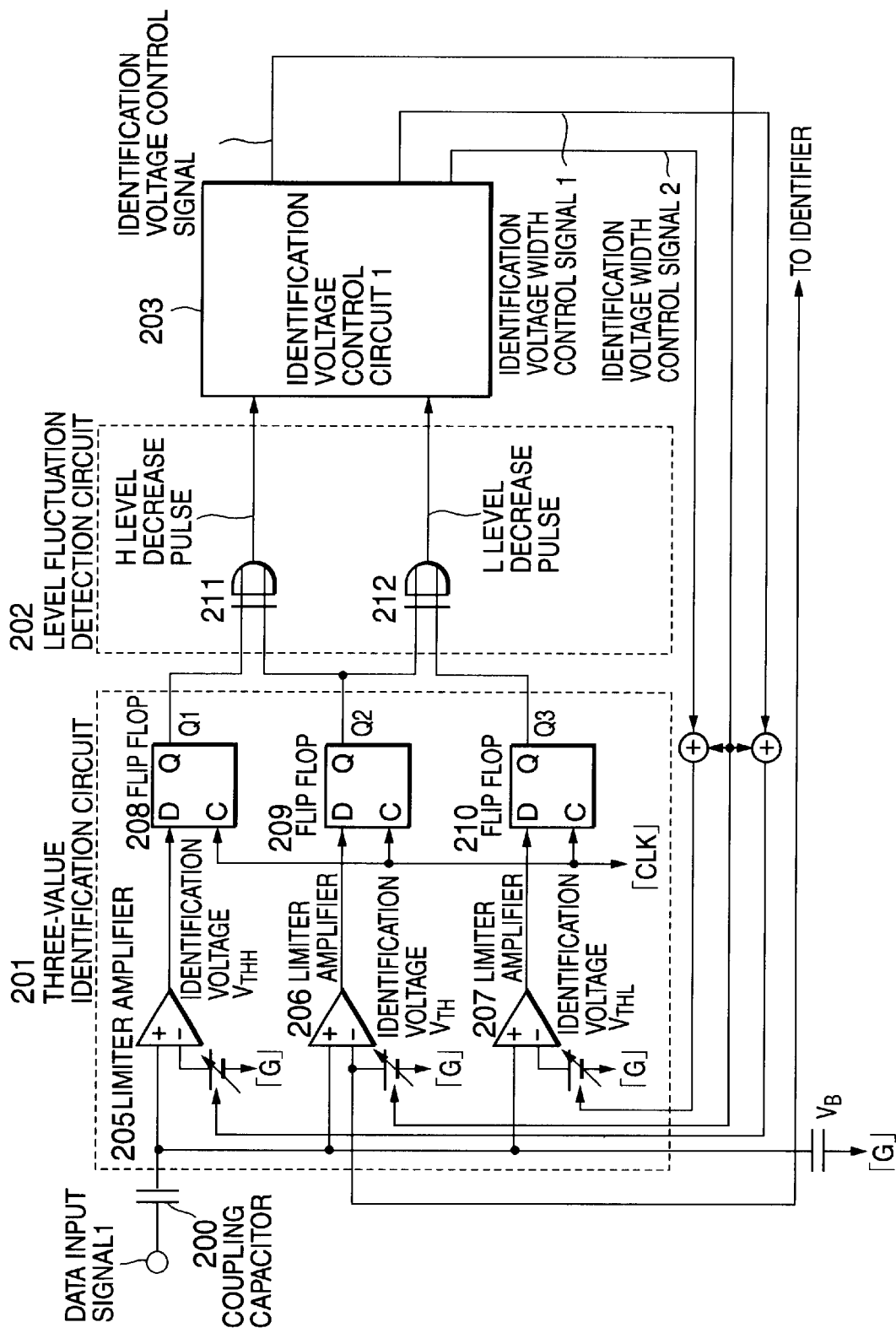
FIG. 2 is a diagram illustrating a structure of an automatic identification level control circuit 2000 according to one embodiment of the present invention.

FIG. 2 is a diagram illustrating a structure of an automatic identification level control circuit 2000 according to the second embodiment of the present invention. A three-value identification circuit 201 and a level fluctuation detection circuit 202 are structurally the same as those in the automatic identification level control circuit 1000 illustrated in FIG. 1. A difference from the structure of FIG. 1 is in that all of the identification voltage control signal, the identification voltage width control signal 1 and the identification voltage width control signal 2 are applied to the inverted terminals of limiter amplifiers 205 to 207. Specifically, the identification voltage control signal is applied to the limiter amplifier 206 as it is. The identification voltage width control signal 1 is applied to the limiter amplifier 205 after the identification voltage control signal is added thereto. The identification voltage width control signal 2 is applied to the limiter amplifier 207 after the identification voltage control signal is added thereto. Thus, the operation principle of the automatic identification level control circuit 2000 is basically the same as that of the automatic identification level control circuit 1000.

However, since the identification voltage control signals are all applied to the inverted terminals of the limiter amplifiers 205 to 207, the direction of control is opposite to that in the case of the identification voltage control signal illustrated in FIG. 1. Accordingly, an identification voltage control circuit 203 illustrated in FIG. 2 has a structure similar to that of the identification voltage control circuit 103 illustrated in FIG. 9 except that the charging circuit 903 and the discharging circuit 904 are switched to each other. The structure of the identification voltage control circuit 203 is illustrated in FIG. 10.

When the H level decrease pulse is received by the discharging circuit, the resulting identification voltage control signal provides a control so as to decrease the identification voltage VTHH, the identification voltage VTH and the identification voltage VTHL. When the L level increase pulse is received by the charging circuit, the resulting identification voltage control signal provides a control so as to increase the identification voltage VTHH, the identification voltage VTH and the identification voltage VTHL.

The identification voltage width control signal 1 and the identification voltage width control signal 2 themselves are the same as those used in the identification voltage control circuit 103 whose structure is illustrated in FIG. 9. However, these identification voltage width control signals are applied as reference voltages to the limiter amplifiers 205 and 206, respectively, after the identification voltage control signal is added thereto.

A voltage VB in the vicinity of the identification voltage VTH is applied as a bias voltage to the non-inverted terminal of each of the limiter amplifiers 205 to 207. In this case, the interval between the identification voltage VTHH and the identification voltage VTH and the interval between the identification voltage VTHL and the identification voltage VTH are not necessarily equal.

Embodiment 3

Figure 3:
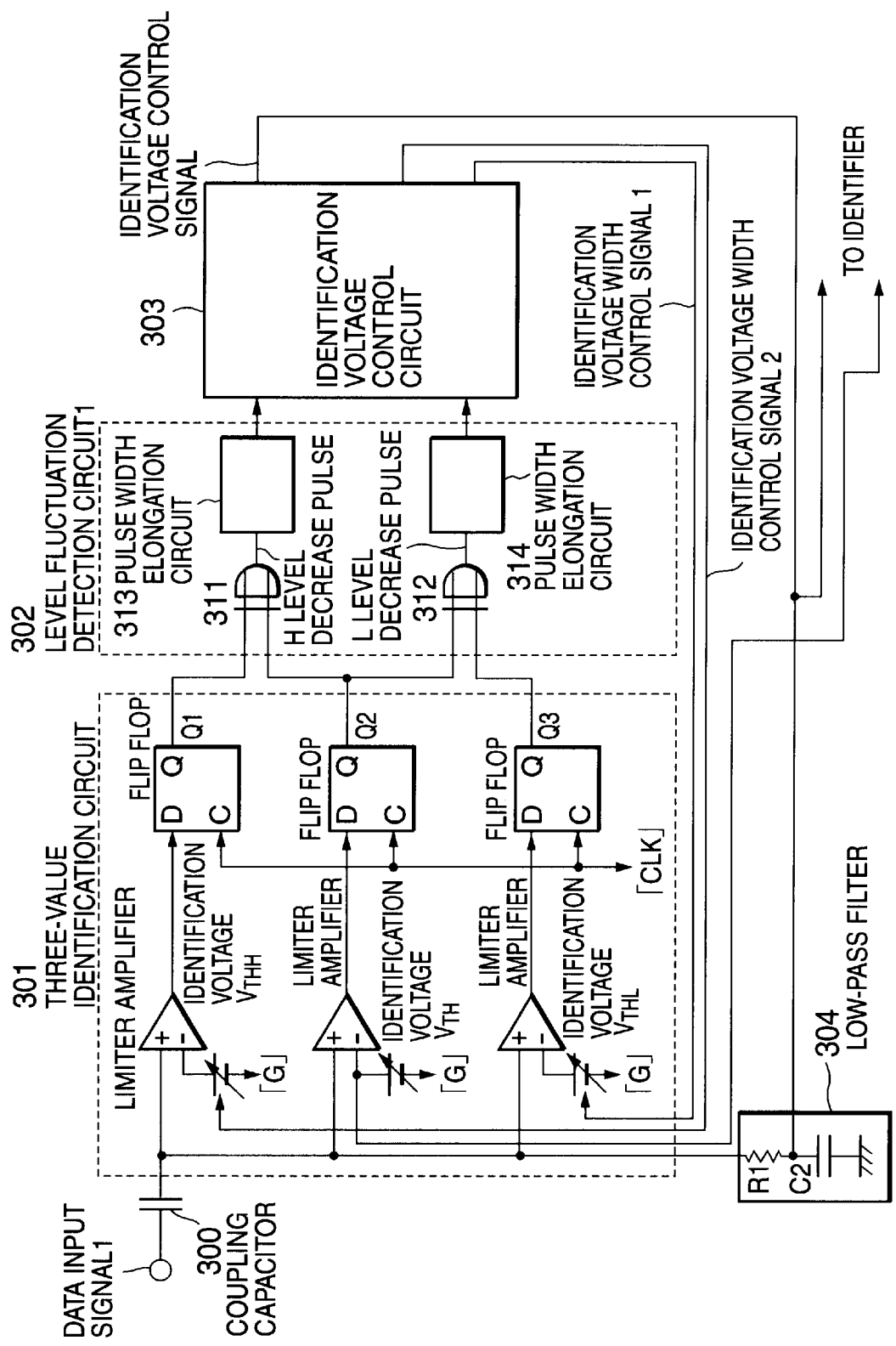
FIG. 3 is a diagram illustrating a structure of an automatic identification level control circuit 3000 according to one embodiment of the present invention.

FIG. 3 is a diagram illustrating a structure of an automatic identification level control circuit 3000 according to the third embodiment of the present invention. This circuit employs a level fluctuation detection circuit 302 in place of the level fluctuation detection circuit 102 illustrated in FIG. 1. The level fluctuation detection circuit 302 is characterized in that it includes a pulse width elongation circuit 313 for elongating the pulse width of the H level decrease pulse which is output from an exclusive OR circuit 311, and another pulse width elongation circuit 314 for elongating the pulse width of the L level increase pulse which is output from another exclusive OR circuit 312. A well-known monostable multivibrator circuit is used for each of the pulse width elongation circuits 313 and 314.

The pulse elongation allows one to employ a slow-operation circuit for an identification voltage control circuit 303 which is connected in a subsequent stage, thereby reducing the complexity and the production cost of the circuit.

Embodiment 4

Figure 4:
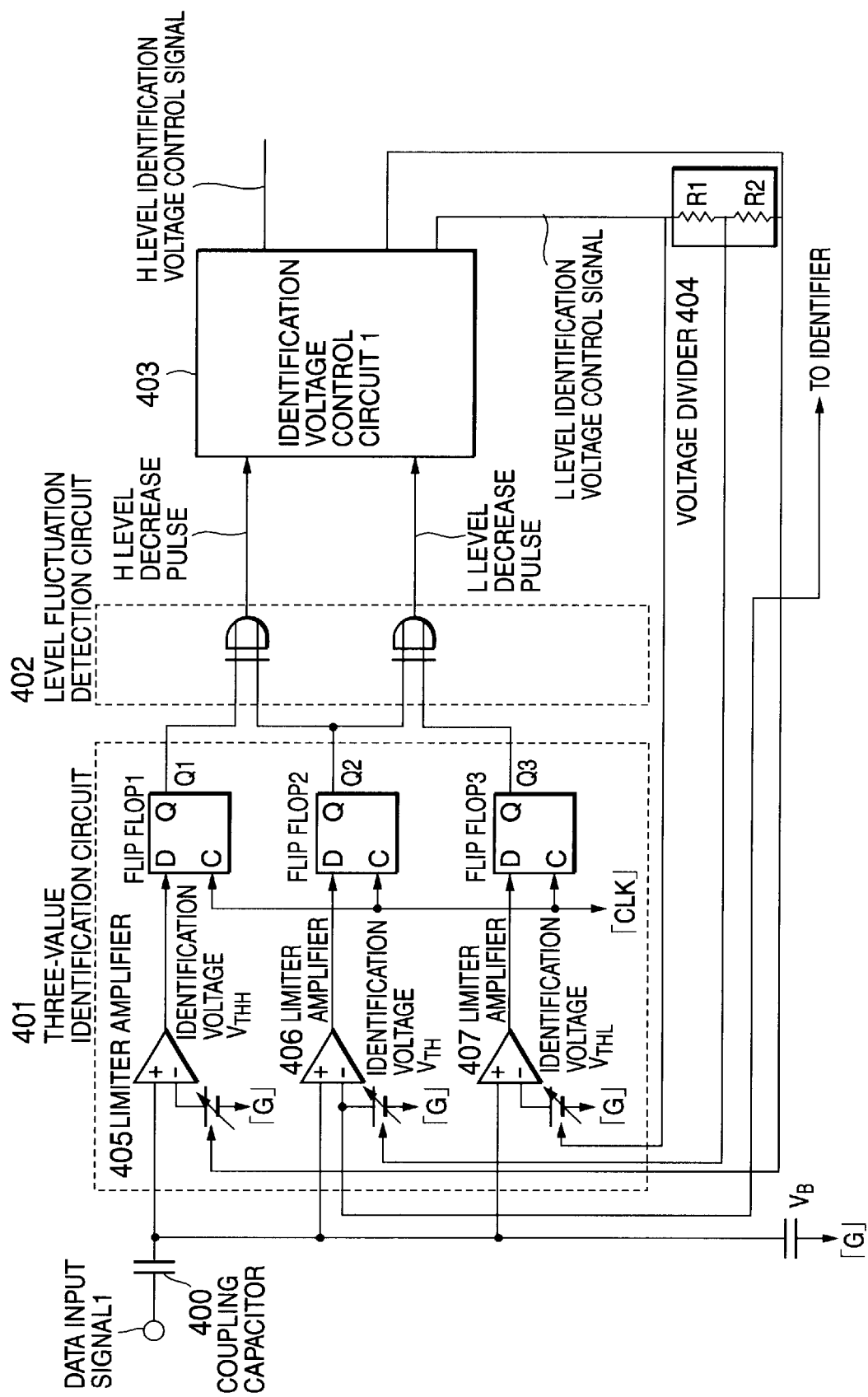
FIG. 4 is a diagram illustrating a structure of an automatic identification level control circuit 4000 according to one embodiment of the present invention.

FIG. 4 is a diagram illustrating a structure of an automatic identification level control circuit 4000 according to the fourth embodiment of the present invention. In this embodiment, a three-value identification circuit 401 and a level fluctuation detection circuit 402 are the same as those used in the automatic identification level control circuit 1000 illustrated in FIG. 1, and thus will not be further described below. An identification voltage control circuit 403 will now be described with reference to FIG. 13.

Figure 13:
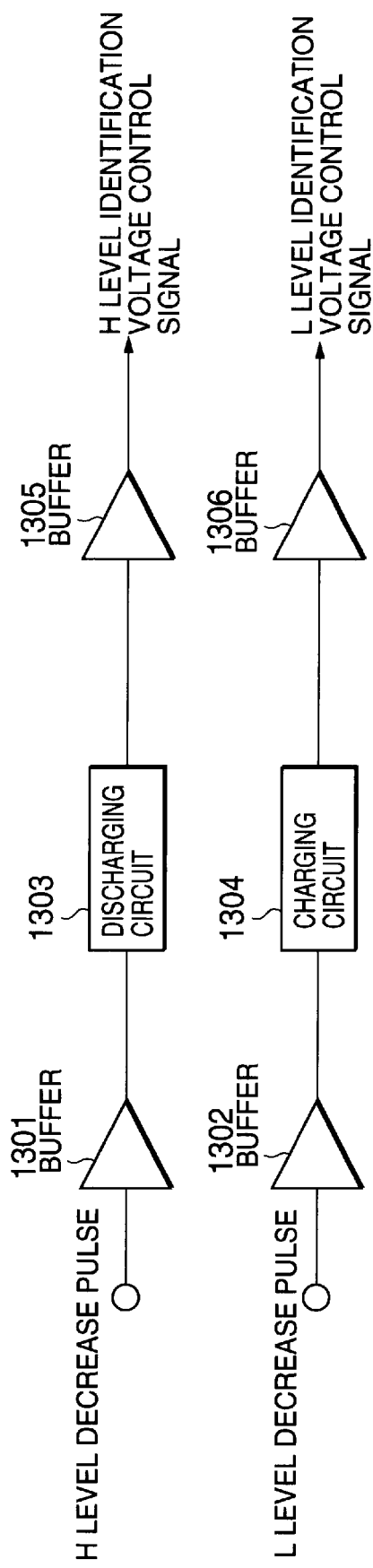
FIG. 13 is a diagram illustrating a structure of an identification voltage control circuit 403 according to one embodiment of the present invention.

As illustrated in FIG. 13, the H level decrease pulse input to the identification voltage control circuit 403 is input to a discharging circuit 1303 via a buffer 1301. The discharging circuit 1303 has a characteristic such that its output voltage decreases as the number of input pulses increases. The output of the discharging circuit 1303 is output via a buffer 1305 as an H level identification voltage control signal. The L level increase pulse is input to a charging circuit 1304 via a buffer 1302. The charging circuit 1304 has a characteristic such that its output voltage increases as the number of input pulses increases, and the output thereof is output via a buffer 1306 as an L level identification voltage control signal.

The H level identification voltage control signal is applied to an identification voltage source which is connected to the inverted terminal of a limiter amplifier 405 illustrated in FIG. 4, and provides a control such that the identification voltage VTHH is decreased as the H level of the data input signal decreases. On the other hand, the L level identification voltage control signal is applied to an identification voltage source which is connected to the inverted terminal of a limiter amplifier 407 illustrated in FIG. 4, and provides a control such that the identification voltage VTHL is increased as the L level of the data input signal increases. The identification voltage VTH is set by a voltage divider 404 to a voltage in the middle between the H level identification voltage control signal and the L level identification voltage control signal. In the present embodiment, the voltage divider 404 is simply implemented by a resistor R1 and a resistor R2. When the resistor R1 and the resistor R2 are set to an equal resistance value, the identification voltage VTH is set to the voltage just in the middle between the H level identification voltage control signal and the L level identification voltage control signal. Alternatively, the identification voltage VTH can be set to a different level by changing the ratio between R1 and R2.

Embodiment 5

Figure 5:
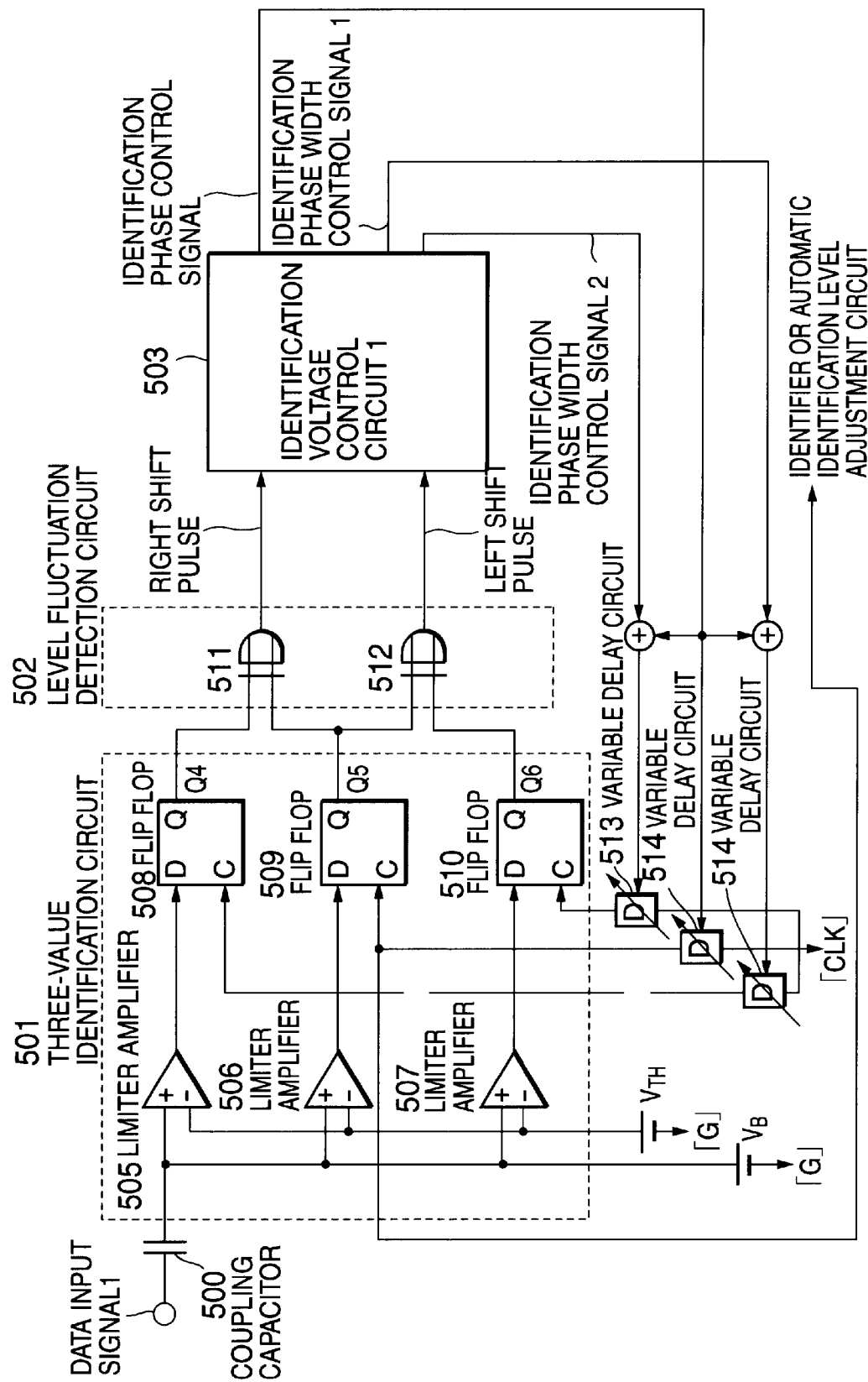
FIG. 5 is a diagram illustrating a structure of an automatic identification phase control circuit 5000 according to one embodiment of the present invention.

FIG. 5 is a diagram illustrating a structure of an automatic identification phase control circuit 5000 according to the fifth embodiment of the present invention. While automatic identification level control circuits of the present invention have been described above, it is also possible to automatically adjust an identification phase based on a principle similar to those used in the automatic identification level control circuits. This will be described with reference to FIG. 5. The automatic identification phase control circuit 5000 includes a three-value identification circuit 501, a level fluctuation detection circuit 502, an identification phase control circuit 503, and variable delay circuits 513 to 515.

The three-value identification circuit 501 includes limiter amplifiers 505 to 507 and flip flops 508 to 510. The three-value identification circuit 501 has substantially the same structure as that of the three-value identification circuit 101 of the automatic identification level control circuit 1000, but has a difference in that the identification voltage VTH is commonly provided to the respective inverted terminals of the limiter amplifiers 505 to 507. Another difference is in that the clock phases are applied to the respective clock terminals C of the flip flops 508 to 510 after they are adjusted by the variable delay circuits 513 to 515, respectively. In this case, the clock phase difference between the clock applied to flip flops 508 and the one applied to flip flops 509, and the clock phase difference between the clock applied to flip flops 509 and the one applied to flip flops 510 are not necessarily equal.

Figures 8A, 8B:
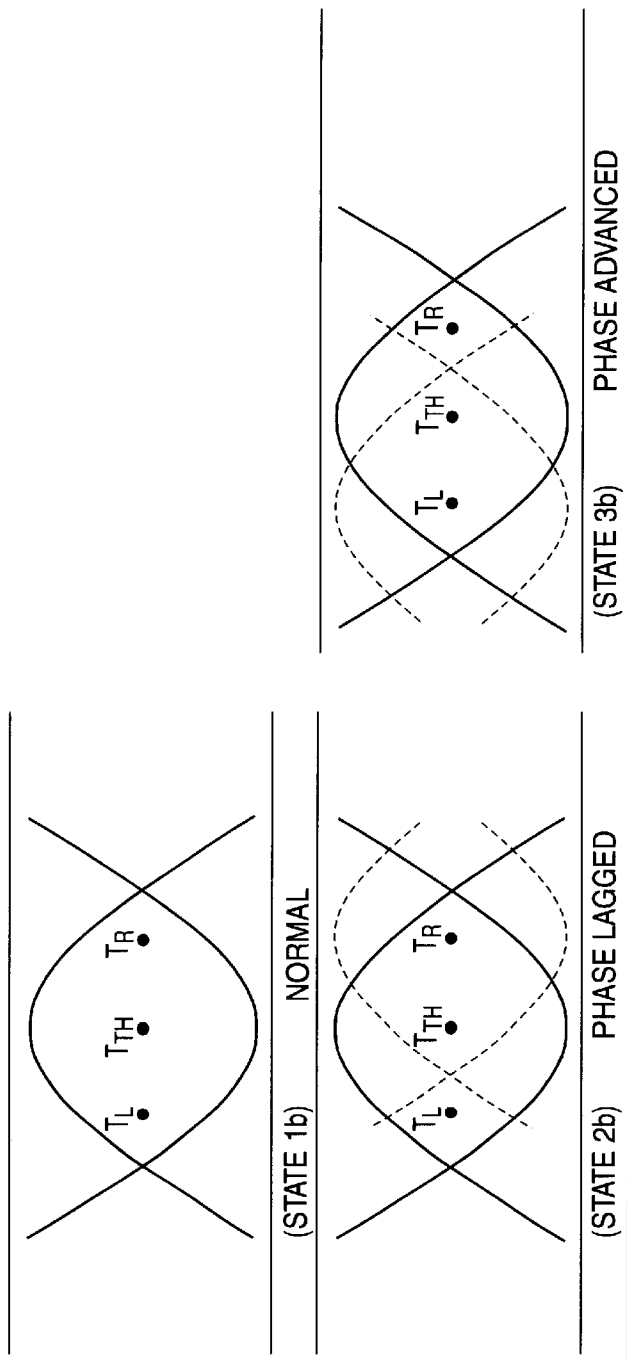
FIGS. 8A and 8B illustrate the operation of one embodiment of the present invention.

Next, the operation of the automatic identification phase control circuit will be described with reference to FIGS. 8A and 8B.

When the identification phase is normal, an identification position TL, an identification position TTH, an identification position TR, and the data input signal 1 are in a relationship as shown in State 1b. That is, the rising point of the data is on the left of the identification position TL while the falling point of the data is on the right of the identification position TR. In such a case, the respective outputs from the limiter amplifiers 505 to 507 illustrated in FIG. 5 are all at the H level or all at the L level. As a result, as shown in "Table illustrating operation of three-value identification circuit and level fluctuation detection circuit" of FIG. 8B, the respective outputs Q4 to Q6 from the flip flops 508 to 510 are also all at the H level or all at the L level, whereby the respective outputs from exclusive OR circuits 511 and 512 are both at the L level.

On the contrary, when the data input signal 1 has shifted to the right as shown in State 2b, whereby the cross point is now between the identification position TL and the identification position TTH, the output from the limiter amplifier 505 illustrated in FIG. 5 is at the L level while the respective outputs from the limiter amplifiers 506 and 507 are at the H level, or the output from the limiter amplifier 505 is at the H level while the respective outputs from the limiter amplifiers 506 and 507 are at the L level. Then, the output Q4 from the flip flop 508 is at the L level while the respective outputs Q5 and Q6 from the flip flops 509 and 510 are at the H level, or the output Q4 from the flip flop 508 is at the H level while the respective outputs Q5 and Q6 from the flip flops 509 and 510 are at the L level. As a result, the output from the exclusive OR circuit 511 is at the H level while the output from the exclusive OR circuit 512 is at the L level.

Conversely, when the data input signal 1 has shifted to the left as shown in State 3b, whereby the cross point is now between the identification position TTH and the identification position TR, the respective outputs from the limiter amplifiers 505 and 506 illustrated in FIG. 5 are at the H level while the output from the limiter amplifier 507 is at the L level, or the respective outputs from the limiter amplifiers 505 and 506 are at the L level while the output from the limiter amplifier 507 is at the H level. Then, as shown in "Table illustrating operation of three-value identification circuit and level fluctuation detection circuit", the respective outputs Q4 and Q5 from the flip flops 508 and 509 are at the H level while the output Q6 from the flip flop 510 is at the L level, or the respective outputs Q5 and Q6 from the flip flops 508 and 509 are at the L level while the output Q6 from the flip flop 510 is at the H level. As a result, the output from the exclusive OR circuit 511 is at the L level while the output from the exclusive OR circuit 512 is at the H level.

Figure 14:
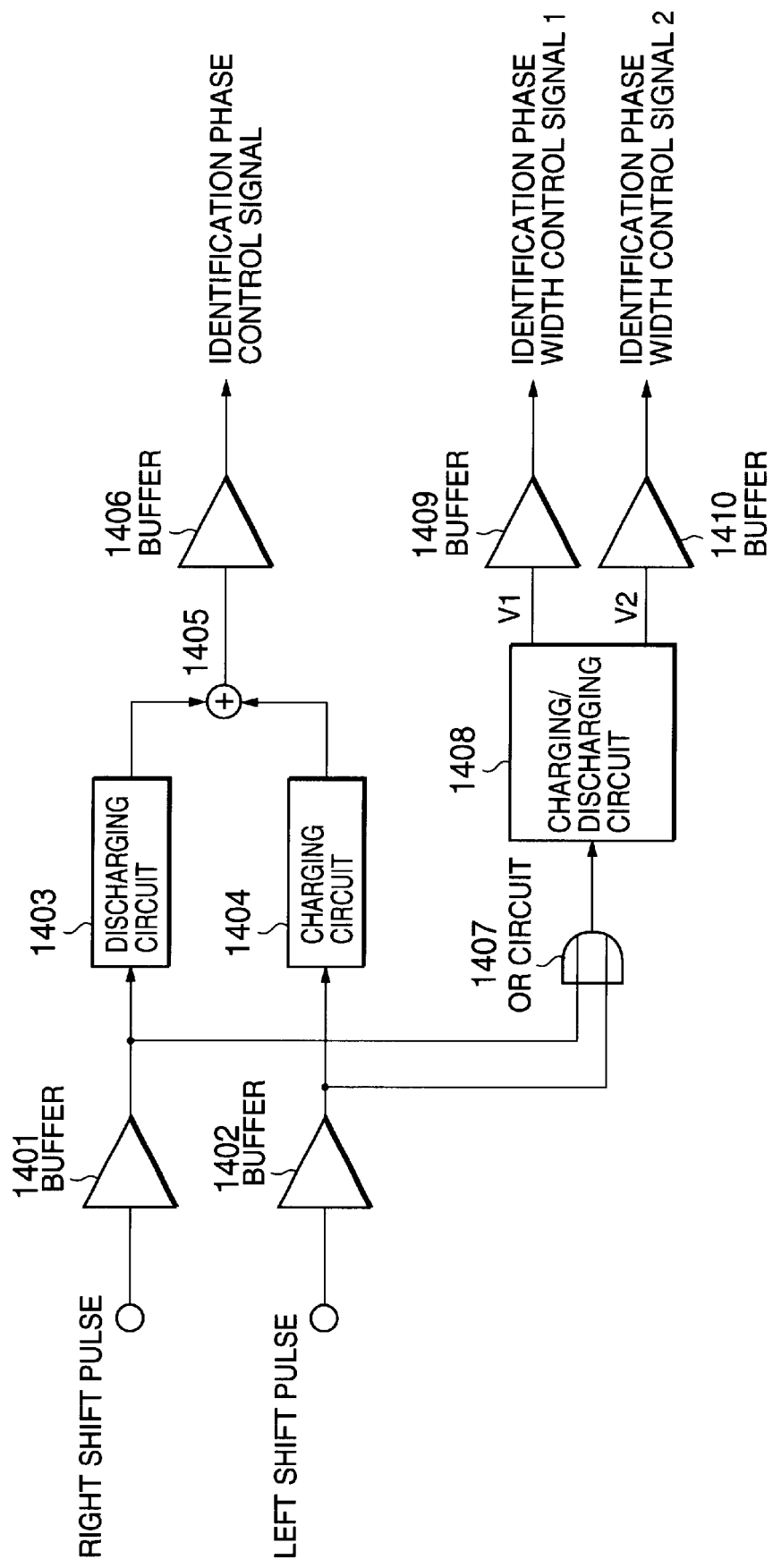
FIG. 14 is a diagram illustrating a structure of an identification phase control circuit 503 according to one embodiment of the present invention.

Next, the operation of an identification phase control circuit 503 illustrated in FIG. 5 will be described with reference to FIG. 14. A right shift pulse from the level fluctuation detection circuit 502 is received at a buffer 1401. The buffer 1401 is inserted for the purpose of preventing noise creeping, and the like, from the surrounding circuits, etc. A discharging circuit 1403 is a type of integration circuit whose output voltage decreases each time the right shift pulse is received and increases when the right shift pulse is no longer received.

As the buffer 1401, a buffer 1402 receiving a left shift pulse is inserted for the purpose of preventing noise creeping, and the like. A charging circuit 1404 is also a type of integration circuit whose output voltage increases each time the left shift pulse is received and decreases when the left shift pulse is no longer received.

The respective outputs from the charging circuit 1404 and the discharging circuit 1403 are added together. When the number of right shift pulses is larger than the number of left shift pulses, the resulting identification phase control signal decreases. Conversely, when the number of right shift pulses is smaller than the number of left shift pulses, the resulting identification phase control signal increases. Specifically, when the number of right shift pulses is larger than the number of left shift pulses, the identification positions TL, TTH and TR are shifted to the right from State 2b of FIG. 8A so as to restore the normal relationship as shown in State 1b. When the number of right shift pulses is smaller than the number of left shift pulses, the identification positions TL, TTH and TR are shifted to the left from State 3b so as to restore the normal relationship as shown in State 1b.

When the identification positions TL, TTH and TR are shifted to the right from State 2b, the identification position TR may be positioned on the right of the cross point if the duty cycle of the data input signal has been reduced. In such a case, the intervals between TL, TTH and TR should be narrowed in order to ensure the normal relationship as shown in State 1b.

Such an interval control operation will be described with reference to FIG. 14.

The logical sum of the right shift pulse and the left shift pulse is produced in the OR circuit 1407. A charging/discharging circuit 1408 is a type of peak value detection circuit, and the operation thereof is such that it is rapidly discharged when either pulse is received and gradually charged when either pulse is no longer received (or vice versa). The charging/discharging circuit 1408 has the output V1 whose voltage is rapidly decreased when a pulse is received and gradually increased when a pulse is no longer received, and another output V2 whose voltage is rapidly increased when a pulse is received and gradually decreased when a pulse is no longer received. Therefore, when either the right shift pulse or the left shift pulse is received, the output V1 of the charging/discharging circuit 1408 provides the identification phase width control signal 1 via a buffer 1409 so as to rapidly shift the identification position TL of the flip flop 508 to the right, while the output V2 of the charging/discharging circuit 1408 provides the identification phase width control signal 1 via a buffer 1410 so as to rapidly shift the identification position TL of the flip flop 510 to the left.

Thus, the interval between the identification position TL and the identification position TTH and the interval between the identification position TTH and the identification position TR can be narrowed when either the right shift pulse or the left shift pulse is received. As a result, even when the amplitude of the data input signal has been reduced, it is possible to ensure the normal relationship as shown in State 1b among TL, TTH and TR. In this case, he interval between the identification position TL and the identification position TTH and the interval between the identification position TTH and the identification position TR are not necessarily equal.

The buffers 1406, 1409 and 1410 are inserted for the purpose of preventing noise creeping, and act as a type of voltage follower. These buffers can be omitted if there is no noise creeping.

Figure 17:
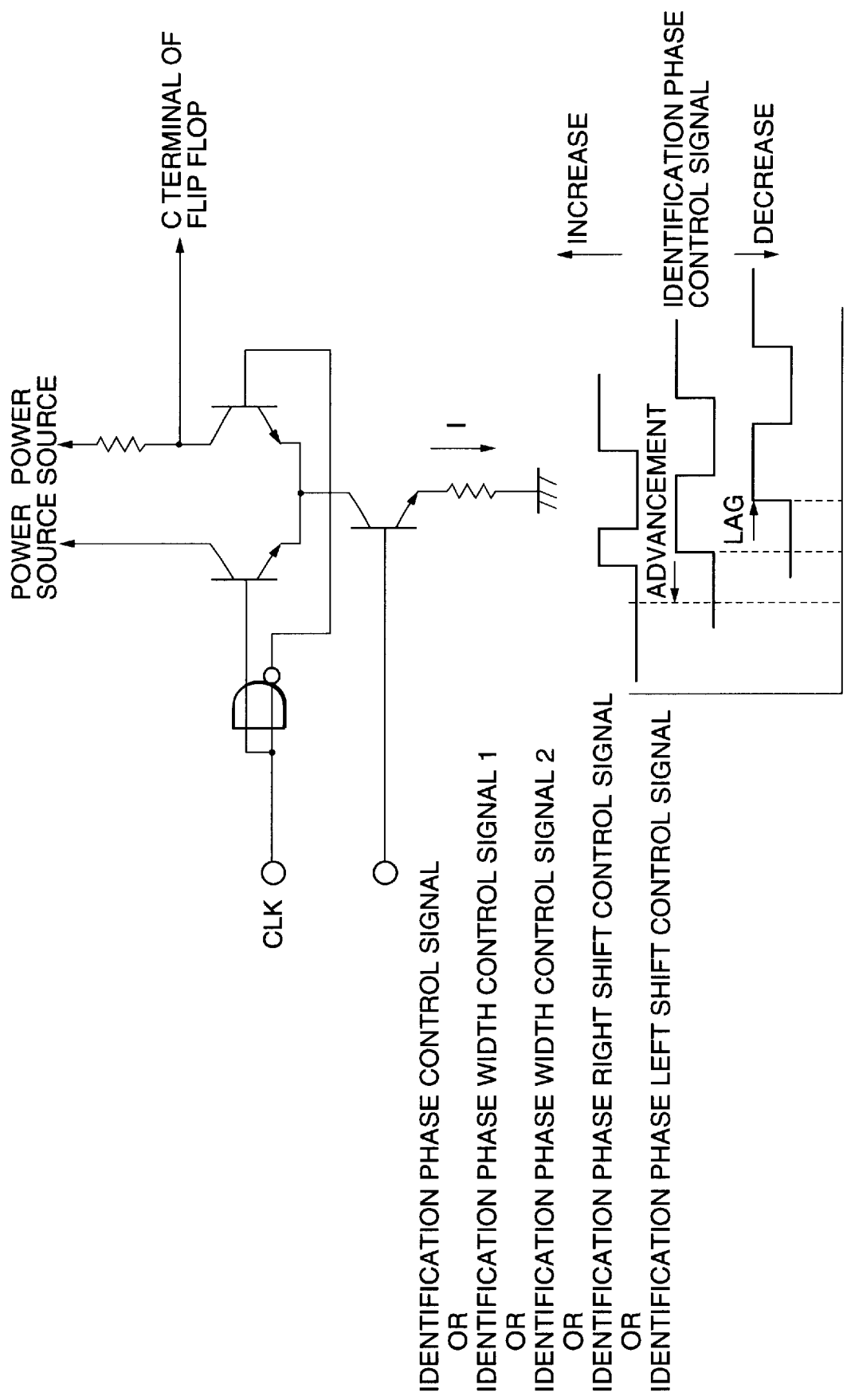
FIG. 17 is a diagram illustrating an exemplary structure of a variable delay circuit used in one embodiment of the present invention.

FIG. 17 illustrates an exemplary structure of the variable delay circuits 513 to 515. The amount of delay is controlled by controlling the current I of a differential amplification circuit which acts as a limiter. When the current I increases, the amount of delay decreases, thereby shifting the clock to the left. When the current I decreases, the amount of delay increases, thereby shifting the clock to the right.

Embodiment 6

Figure 6:
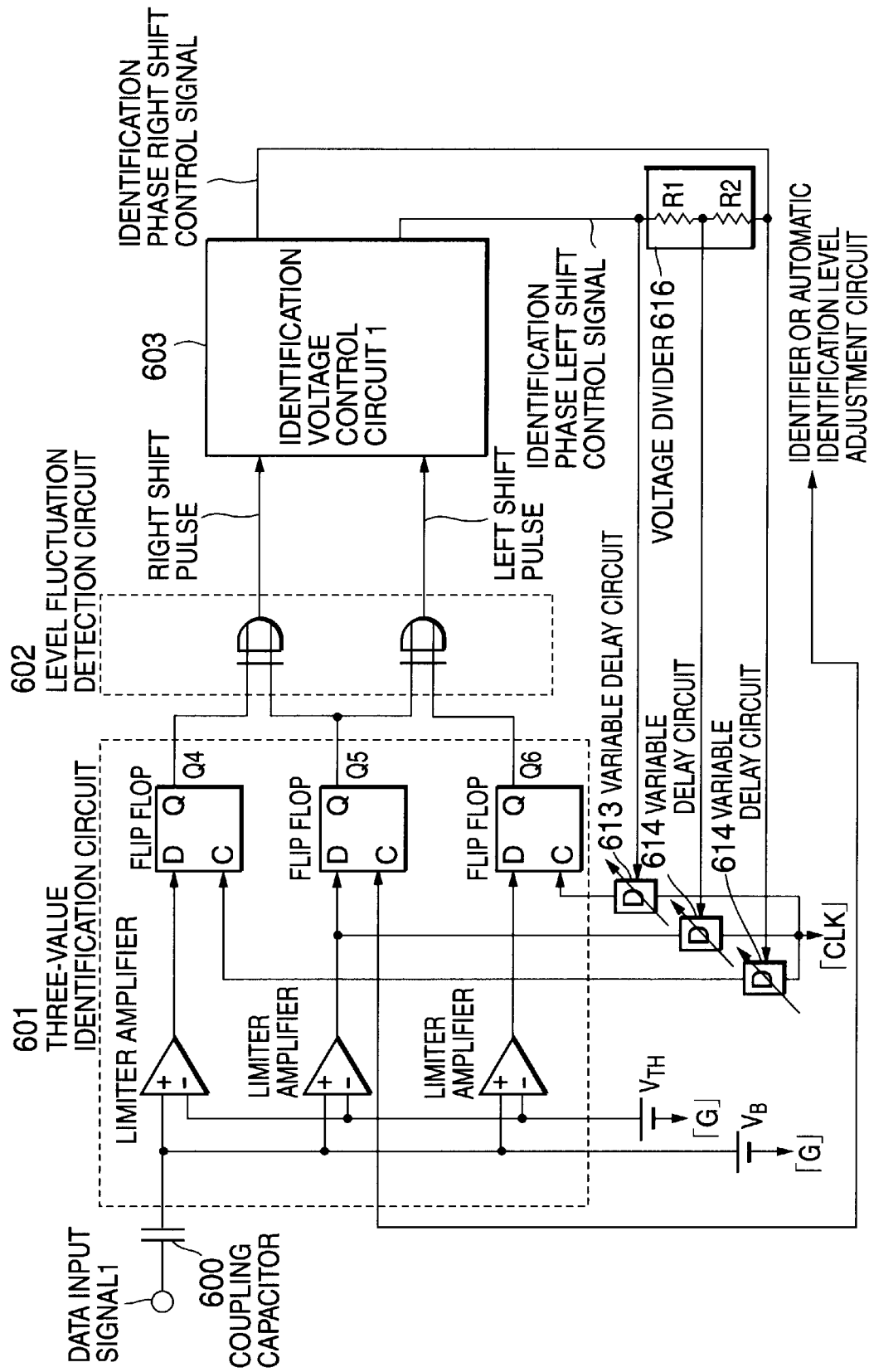
FIG. 6 is a diagram illustrating a structure of an automatic identification phase control circuit 6000 according to one embodiment of the present invention.

FIG. 6 is a diagram illustrating a structure of an automatic identification phase control circuit 6000 according to the sixth embodiment of the present invention. In this embodiment, a three-value identification circuit 601 and a level fluctuation detection circuit 602 are the same as those used in the automatic identification phase control circuit 5000 illustrated in FIG. 5, and thus will not be further described below. An identification phase control circuit 603 will now be described with reference to FIG. 16.

The right shift pulse input to the identification phase control circuit 603 is input to a discharging circuit 1603 via a buffer 1601. The discharging circuit 1603 has a characteristic such that its output voltage decreases as the number of input pulses increases and increases as the number of input pulses decreases. The output of the discharging circuit 1603 is output via a buffer 1605 as an identification phase right shift control signal. The left shift pulse is input to a charging circuit 1604 via a buffer 1602. The charging circuit 1604 has a characteristic such that its output voltage increases as the number of input pulses increases and decreases as the number of input pulses decreases. The output of the charging circuit 1604 is output via a buffer 1606 as an identification phase left shift control signal.

The identification phase right shift control signal is applied to a variable delay circuit 615 illustrated in FIG. 6, and controls the variable delay circuit 615 so that the clock CLK is delayed as the data input signal shifts to the right. Similarly, the identification phase left shift control signal is applied to a variable delay circuit 613 illustrated in FIG. 6, and controls the variable delay circuit 613 so that the clock CLK is advanced as the data input signal shifts to the left.

The output from a voltage divider 616 is set to a voltage in the middle between the identification phase right shift control signal and the identification phase left shift control signal, and controls a variable delay circuit 614 so that the amount of delay thereof is in the middle between the amount of delay of the variable delay circuit 613 and the amount of delay of the variable delay circuit 615. In the present embodiment, the voltage divider 616 is simply implemented by a resistor R1 and a resistor R2. When the resistor R1 and the resistor R2 are set to an equal resistance value, the amount of delay of the variable delay circuit 614 is set to the amount just in the middle between the amount of delay of the variable delay circuit 613 and the amount of delay of the variable delay circuit 615. Alternatively, the voltage division ratio is not limited to this.

Embodiment 7

Figure 11:
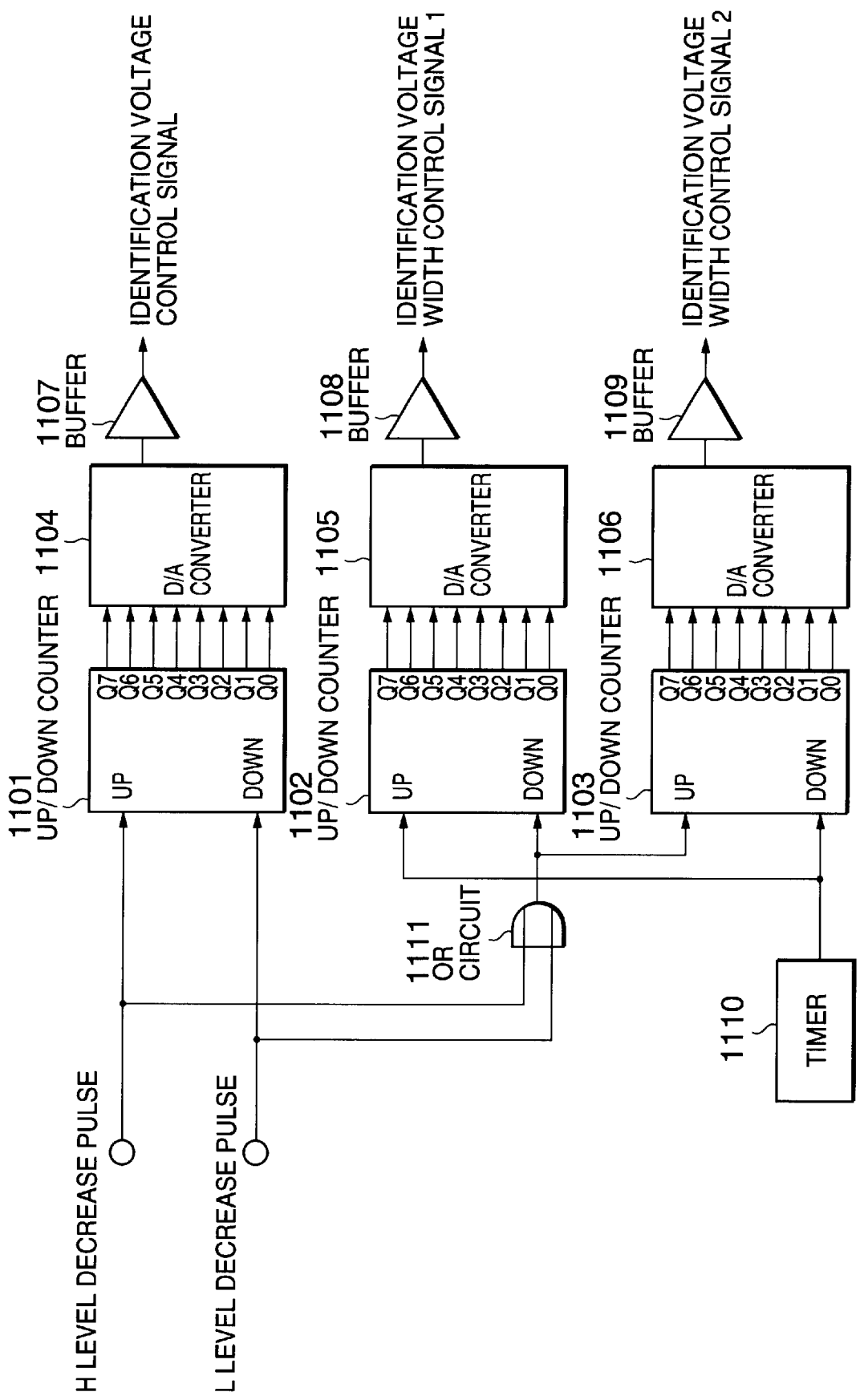
FIG. 11 is a diagram illustrating a structure of an identification voltage control circuit 103' according to one embodiment of the present invention.

FIG. 11 is a diagram illustrating a structure of an identification voltage control circuit 103' according to the seventh embodiment of the present invention. The identification voltage control circuit 103' illustrated in FIG. 11 is a variation of the identification voltage control circuit 103.

The identification voltage control circuit 103' includes: up/down counters 1101 to 1103; D/A converters 1104 to 1106 connected to the up/down counters 1101 to 1103, respectively; buffers 1107 to 1109; a timer 1110; and an OR circuit 1111.

Next, the operation of the identification voltage control circuit 103' will be described. The up/down counter 1101 counts up each time the H level decrease pulse is received, and the up/down counter 1101 counts down each time the L level increase pulse is received. The output from the up/down counter 1101 is converted by the D/A converter 1104 into an analog identification voltage control signal.

Therefore, when the number of H level decrease pulses is larger than the number of L level increase pulses, the voltage of the identification voltage control signal increases. When the number of H level decrease pulses is smaller than the number of L level increase pulses, the voltage of the identification voltage control signal decreases.

The logical sum of the H level decrease pulse and the L level increase pulse is input to the DOWN terminal of the up/down counter 1102. Therefore, the up/down counter 1102 counts down, thereby decreasing the identification voltage width control signal 1, each time either the H level decrease pulse or the L level increase pulse is received by the identification voltage control circuit 103'. Similarly, the logical sum of the H level decrease pulse and the L level increase pulse is input to the UP terminal of the up/down counter 1103. Therefore, each time either of these pulses is received, the up/down counter 1103 counts up, thereby increasing the identification voltage width control signal 2.

The timer 1110 causes the up/down counter 1102 to count up, thereby increasing the voltage of the identification voltage width control signal 1, when neither the H level decrease pulse nor the L level increase pulse is received. The timer 1110 also causes the up/down counter 1103 to count down, thereby decreasing the voltage of the identification voltage width control signal 2, when neither the H level decrease pulse nor the L level increase pulse is received.

The cycle of the timer 1110 is set to be sufficiently long with respect to the clock CLK. Therefore, the interval between VTHH and VTH and the interval between VTH and VTHL can be rapidly narrowed when either the H level decrease pulse or the L level increase pulse is received, and the interval between VTHH and VTH and the interval between VTH and VTHL can be gradually widened when neither the H level decrease pulse nor the L level increase pulse is received.

Figure 12:
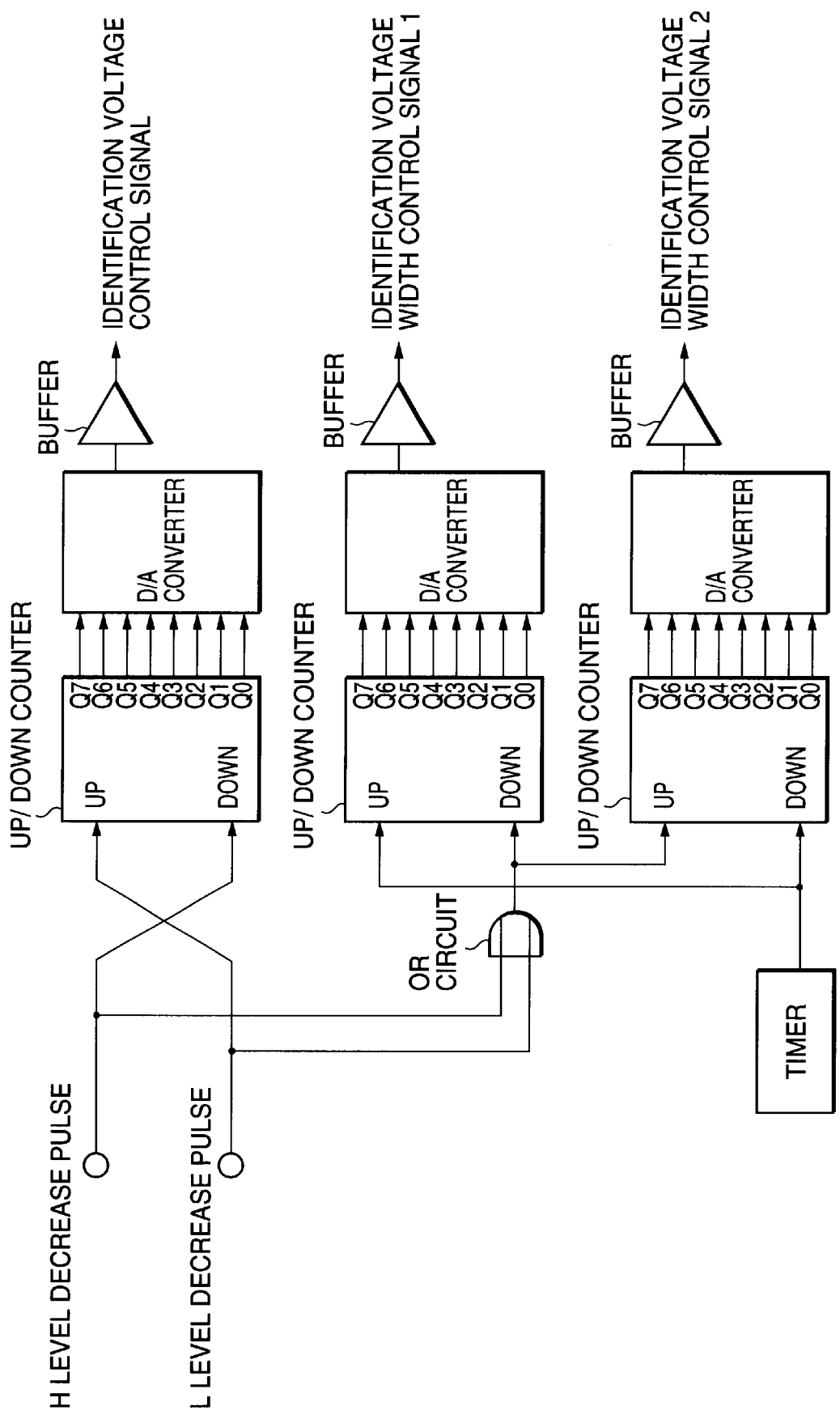
FIG. 12 is a diagram illustrating a structure of an identification voltage control circuit 203' according to one embodiment of the present invention.

FIG. 12 is a diagram illustrating a structure of an identification voltage control circuit 203' which can be used in the automatic identification level control circuit 2000. In this structure, the direction of control is opposite to that in the case of the automatic identification level control circuit 1000. Accordingly, the H level decrease pulse is connected to the DOWN terminal of an up/down counter 1201, while the L level increase pulse is connected to the UP terminal of the up/down counter 1201.

Figure 15:
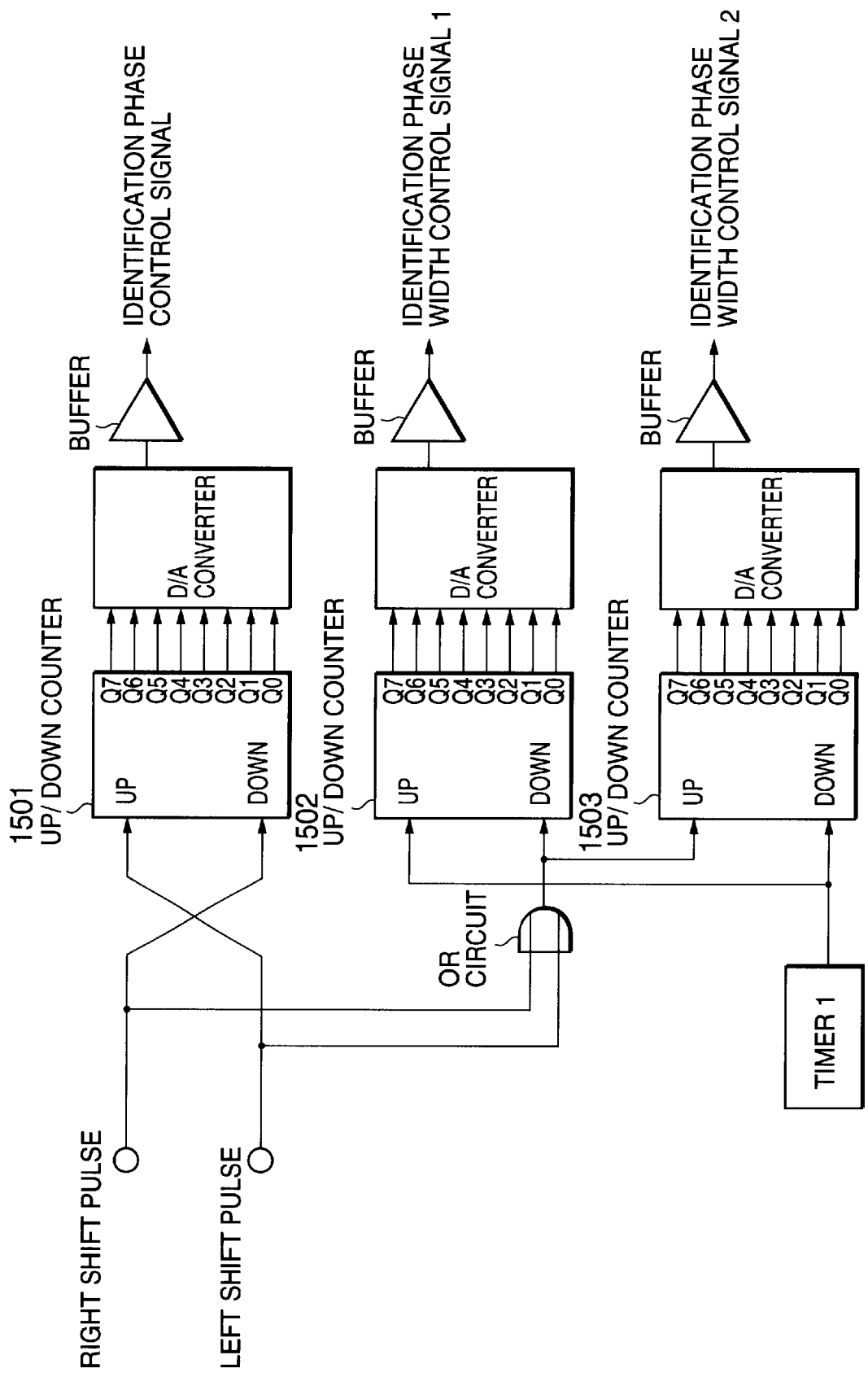
FIG. 15 is a diagram illustrating a structure of an identification phase control circuit 503' according to one embodiment of the present invention.
Figure 16:
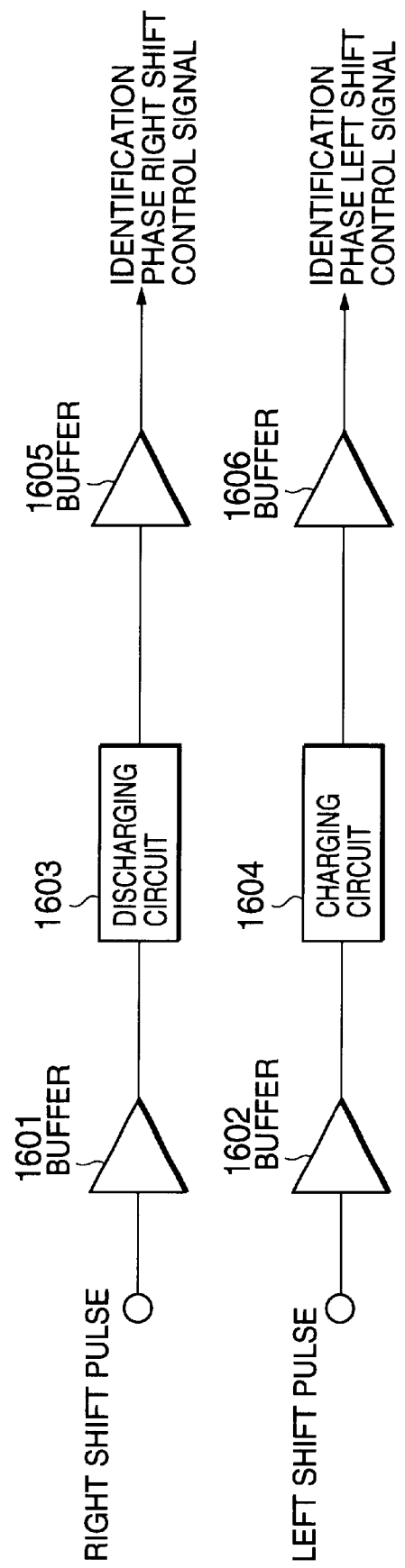
FIG. 16 is a diagram illustrating a structure of an identification phase control circuit 603 according to one embodiment of the present invention.

FIG. 15 is a diagram illustrating a structure of an identification phase control circuit 503'. The structure of the identification phase control circuit 503' is substantially the same as that of the identification voltage control circuit 203' illustrated in FIG. 12. In the identification phase control circuit 503', the right shift pulse is connected to the DOWN terminal of an up/down counter 1501, and the left shift pulse is connected to the UP terminal of the up/down counter 1501.

Embodiment 8

Figure 18:
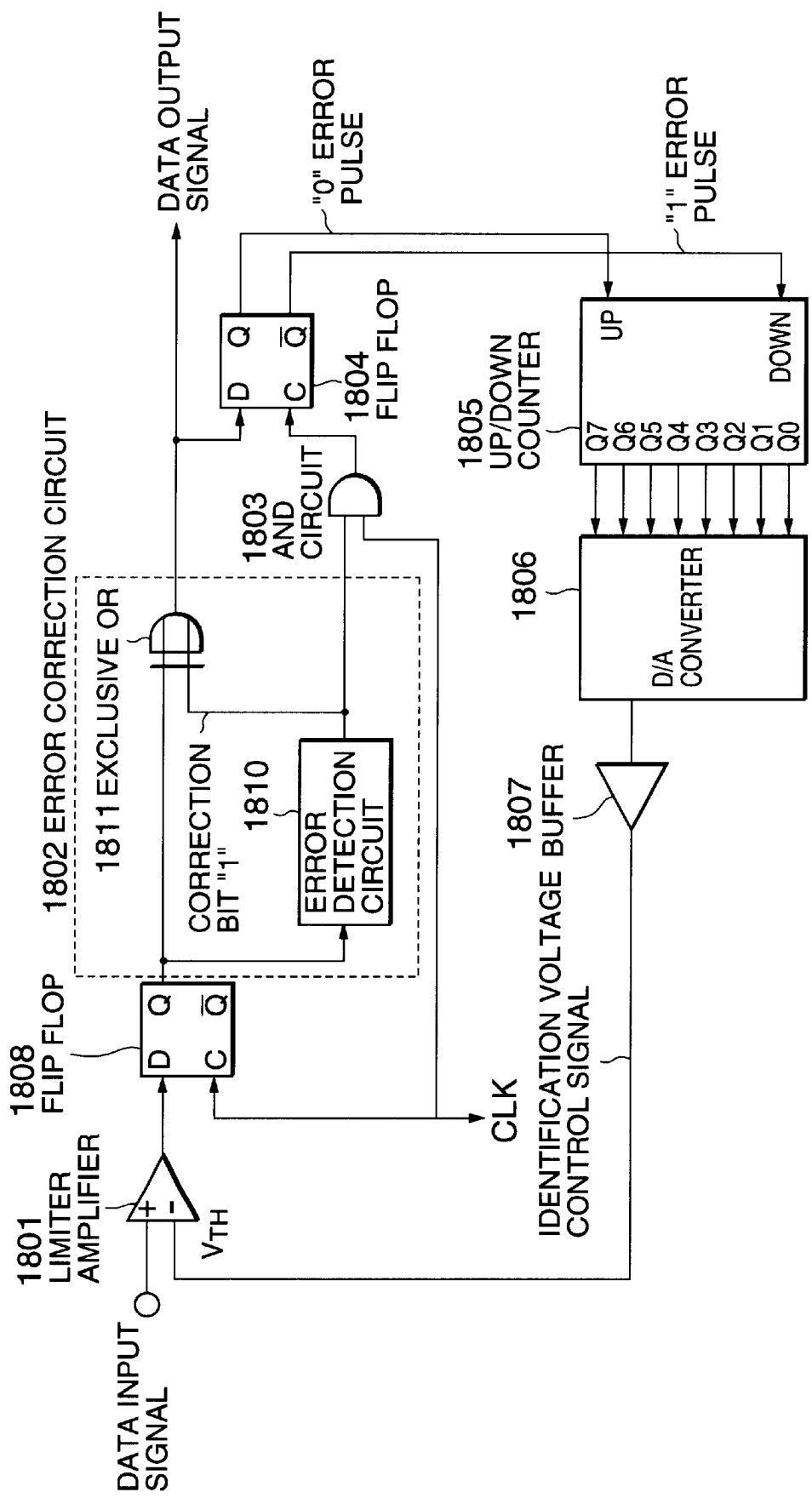
FIG. 18 is a diagram illustrating a structure of an automatic identification level control circuit 8000 according to one embodiment of the present invention.

FIG. 18 is a diagram illustrating an automatic identification level control circuit 8000 according to the eighth embodiment of the present invention. The present embodiment employs an error correction circuit for the automatic identification level adjustment.

The automatic identification level control circuit 8000 illustrated in FIG. 18 includes a limiter amplifier 1801, an error correction circuit 1802, an AND circuit 1803, a flip flop 1804, an up/down counter 1805, a D/A converter 1806, a buffer 1807, and a flip flop 1808.

The limiter amplifier 1801 compares the H level or the L level of the data input signal 1 with the identification voltage VTH. The error correction circuit 1802 includes an error detection circuit 1810 for detecting an error in data and, if an error is detected, outputting a correction bit "1", and an exclusive OR circuit 1811. The AND circuit 1803 produces the logical product of CLK and the output signal from the error detection circuit. The D/A converter 1806 converts the output signal from the up/down counter into an analog voltage signal.

Next, the operation of the automatic identification level control circuit 8000 will be described. The data input signal is input to the non-inverted terminal of the limiter amplifier 1801, where it is compared with the identification voltage VTH, so as to determine whether the data is at the H level or at the L level. The resulting identification output is received by the flip flop 1808 at the timing of CLK. The output from the flip flop 1808 is input to the error detection circuit 1810, where it is checked whether the code string contains an error. If an error is detected, the error detection circuit 1810 outputs a correction bit "1". Correct data can be recovered from the erroneous data by obtaining the exclusive OR value of the correction bit and the output from the flip flop 1808.

If the resulting binary value after the correction with the correction bit is "1", it is indicated that "0" has been corrected to "1". If the resulting binary value after the correction with the correction bit is "0", it is indicated that "1" has been corrected to "0". Thus, whether the error data was originally data of "1" or data of "0" can be known from the corrected result.

The flip flop 1804 receives data when the correction bit is "1". If the received data is "1", the flip flop 1804 outputs a "0" error pulse to the UP terminal of the up/down counter 1805 so as to cause the up/down counter 1805 to count up. If the data received when the correction bit is "1" is "0", the flip flop 1804 outputs a "1" error pulse to the DOWN terminal of the up/down counter 1805 so as to cause the up/down counter 1805 to count down. The output from the up/down counter 1805 is converted by the D/A converter 1806 into an analog voltage signal, and then provided as an identification voltage to the inverted terminal of the limiter amplifier 1801. When the "0" error pulse occurs, the up/down counter 1805 counts up, and the resulting identification voltage control signal provides a control such that the identification voltage VTH is increased. When the "1" error pulse occurs, the up/down counter 1805 counts down, and the resulting identification voltage control signal provides a control such that the identification voltage VTH is decreased. In this way, it is possible to adjust the identification voltage VTH to the optimal position.

Embodiment 9

Figure 19:
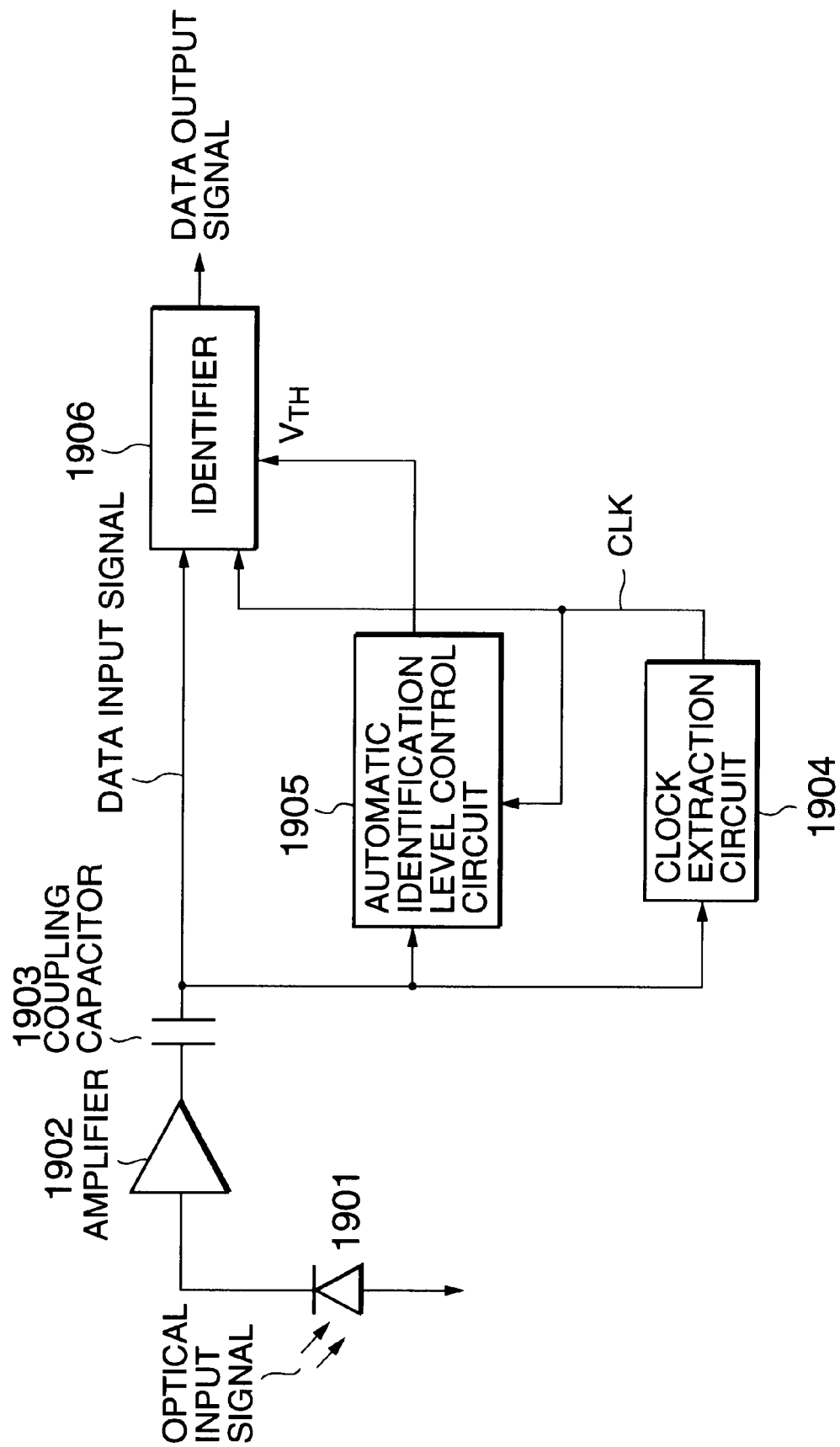
FIG. 19 is a diagram illustrating a structure of an optical receiver circuit according to one embodiment of the present invention.

FIG. 19 is a diagram illustrating an exemplary structure of an optical receiver circuit 9000 according to the ninth embodiment of the present invention, incorporating an automatic identification level control circuit of the present invention.

The optical receiver circuit 9000 includes a photoelectric converter 1901 for converting an optical signal into an electric signal, an amplifier 1902 for amplifying the converted electric signal, a coupling capacitor 1903, a clock extraction circuit 1904, an automatic identification level control circuit 1905, and an identifier 1906.

The output from the amplifier 1902 is provided via the coupling capacitor 1903 to the clock extraction circuit 1904, the automatic identification level control circuit 1905 and the identifier 1906. The clock extraction circuit 1904 extracts a clock component from a data input signal, and provides the extracted clock component to the automatic identification level control circuit 1905 and the identifier 1906. The identifier 1906 identifies the data input signal with the identification voltage VTH which has been optimally adjusted by the automatic identification level control circuit 1905. A well-known PLL circuit is used for the clock extraction circuit 1904. Any of the automatic identification level control circuits 1000 to 4000 can be used for the automatic identification level control circuit 1905.

Embodiment 10

Figure 20:
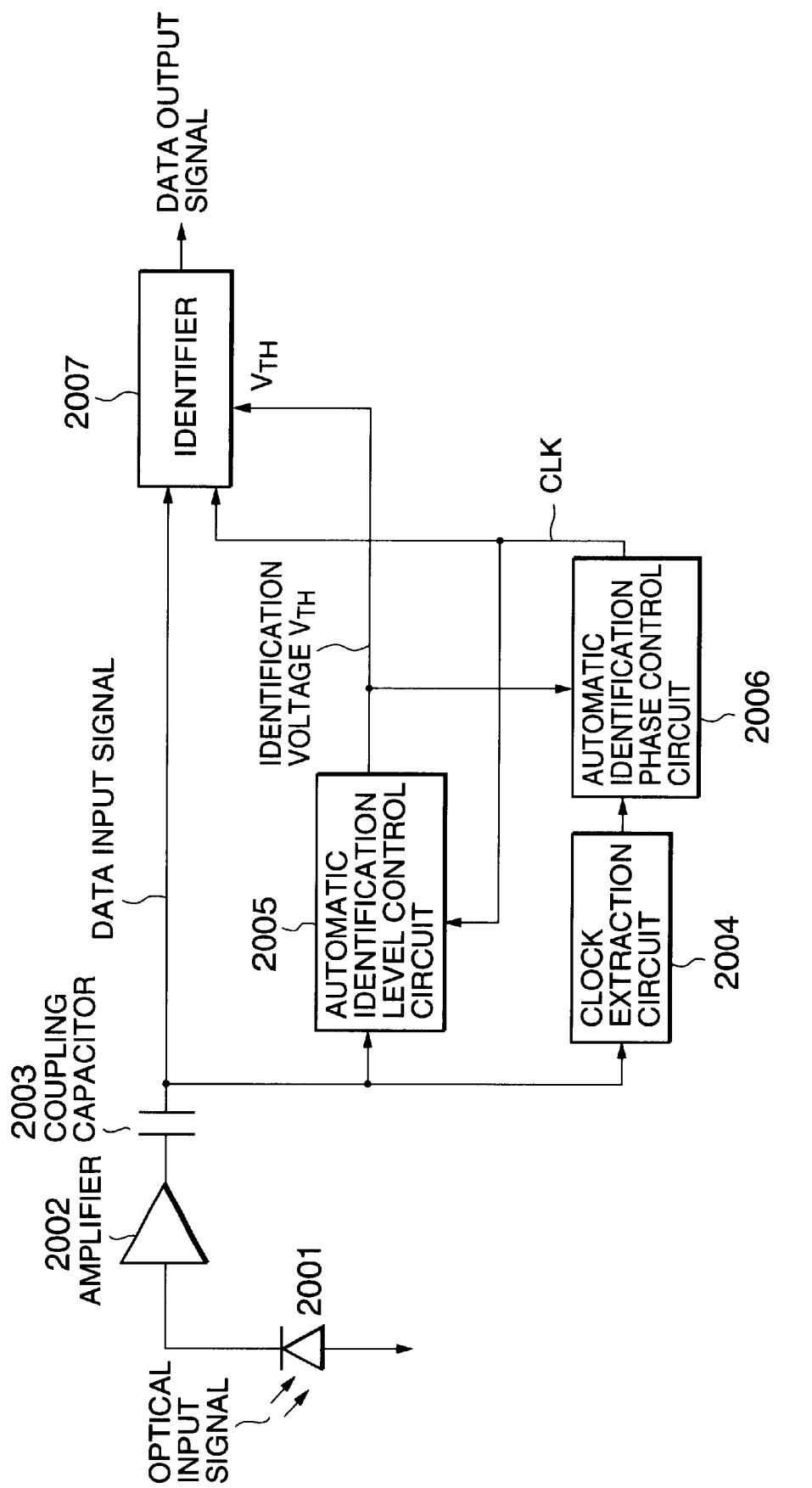
FIG. 20 is a diagram illustrating a structure of an optical receiver circuit according to one embodiment of the present invention.

FIG. 20 is a diagram illustrating an exemplary structure of an optical receiver circuit 10000 according to the tenth embodiment of the present invention, incorporating an automatic identification level control circuit and an automatic identification phase control circuit of the present invention.

The optical receiver circuit 10000 illustrated in FIG. 20 includes a photoelectric converter 2001 for converting an optical signal into an electric signal, an amplifier 2002 for amplifying the converted signal, a coupling capacitor 2003, a clock extraction circuit 2004, an automatic identification level control circuit 2005, an automatic identification phase control circuit 2006, and an identifier 2007.

The output from the amplifier 2002 is provided via the coupling capacitor 2003 to the clock extraction circuit 2004, the automatic identification level control circuit 2005 and the identifier 2007. The clock extraction circuit 2004 extracts a clock component from a data input signal, and provides the extracted clock component to the automatic identification level control circuit 2005 and the identifier 2007.

The output from the clock extraction circuit 2004 is received by the automatic identification phase control circuit 2006. After the identification phase is optimized by the automatic identification phase control circuit 2006, the resulting clock signal CLK is provided to the identifier 2007 and the automatic identification level control circuit 2005. The identifier 2007 identifies the data input signal with the identification voltage VTH which has been optimally adjusted by the automatic identification level control circuit 2005 and with the identification phase which has been optimally adjusted by the automatic identification phase control circuit 2006.

A well-known PLL circuit is used for the clock extraction circuit 2004. Any of the automatic identification level control circuits 1000 to 4000 can be used for the automatic identification level control circuit 2005, and either one of the automatic identification phase control circuits 5000 and 6000 can be used for the automatic identification phase control circuit 2006.

Embodiment 11

Figure 21:
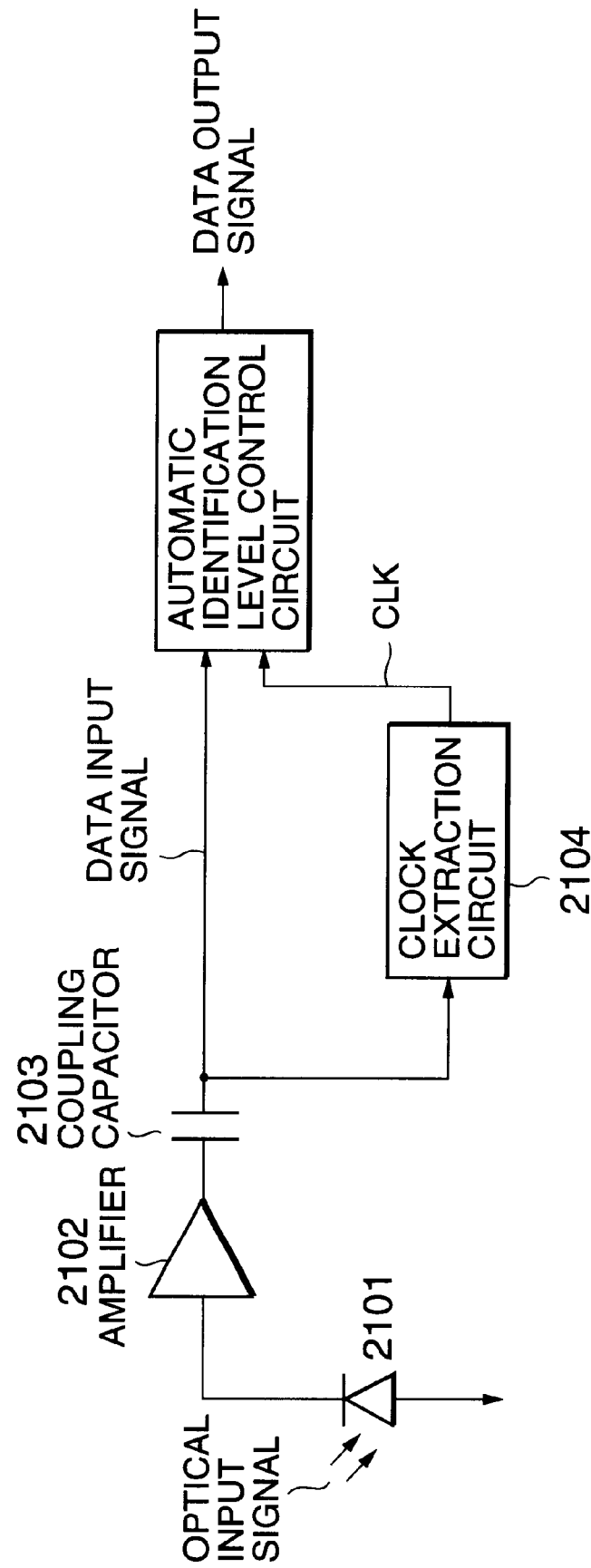
FIG. 21 is a diagram illustrating a structure of an optical receiver circuit according to one embodiment of the present invention.

FIG. 21 is a diagram illustrating an exemplary structure of an optical receiver circuit 11000 according to the eleventh embodiment of the present invention, incorporating the automatic identification level control circuit 8000 of the present invention.

The optical receiver circuit 11000 illustrated in FIG. 21 includes a photoelectric converter 2101 for converting an optical signal into an electric signal, an amplifier 2102 for amplifying the converted signal, a coupling capacitor 2103, a clock extraction circuit 2104, and the automatic identification level control circuit 8000.

The output from the amplifier 2102 is provided via the coupling capacitor 2103 to the clock extraction circuit 2104 and the automatic identification level control circuit 8000. The clock extraction circuit 2104 extracts a clock component from a data input signal, and provides the extracted clock component to the automatic identification level control circuit 8000. A well-known PLL circuit is used for the clock extraction circuit 2104.

Embodiment 12

Figure 22:
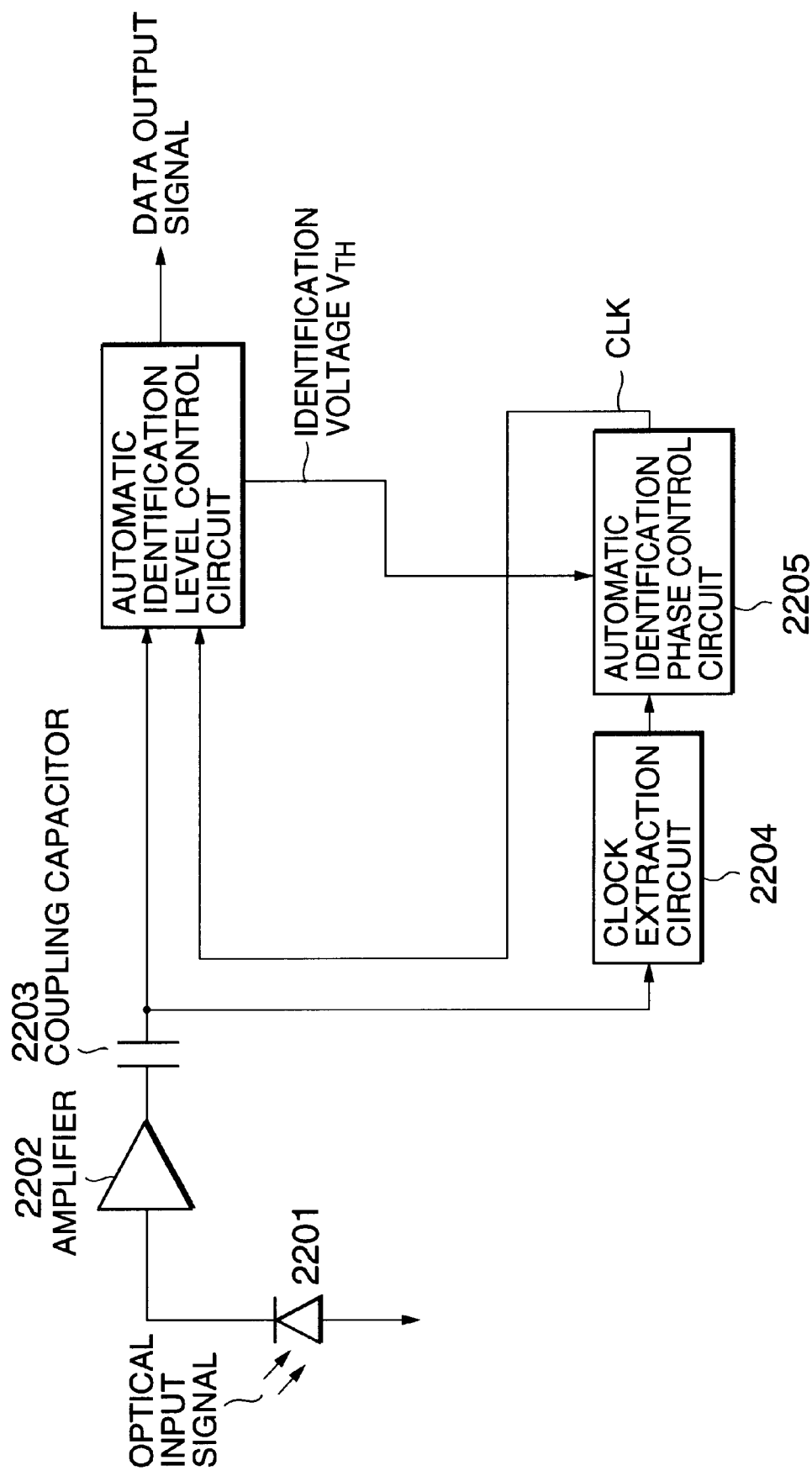
FIG. 22 is a diagram illustrating a structure of an optical receiver circuit according to one embodiment of the present invention.

FIG. 22 is a diagram illustrating an exemplary structure of an optical receiver circuit 12000 according to the twelfth embodiment of the present invention, incorporating the automatic identification level control circuit 8000 and an automatic identification phase control circuit of the present invention.

The optical receiver circuit 12000 illustrated in FIG. 22 includes a photoelectric converter 2201 for converting an optical signal into an electric signal, an amplifier 2202 for amplifying the converted signal, a coupling capacitor 2203, a clock extraction circuit 2204, the automatic identification level control circuit 8000, and an automatic identification phase control circuit 2205.

The output from the amplifier 2202 is provided via the coupling capacitor 2203 to the clock extraction circuit 2204 and the automatic identification level control circuit 8000. The clock extraction circuit 2204 extracts a clock component from a data input signal. The extracted clock is input to the automatic identification phase control circuit 2205. After the identification position is optimized for the data signal by the automatic identification phase control circuit 2205, the resulting clock signal CLK is provided to the automatic identification level control circuit 8000. Again, a well-known PLL circuit is used for the clock extraction circuit 2204.

Embodiment 13

In above described embodiments, the identification level control circuit and the identification circuits for main signal are organized in separate circuits. On the contrary, it show another example in which identify the main signal by using D-FF in the identification level control circuit. Using circuit construction, it enables that optical receiver circuit to organize without other identification circuits for main signal, and in addition, to prevent aberration of the optimal identification levels between the automatic identification level control circuit and the identification circuits for identify main signal, depending on the dispersion of elements in LSI.

Figure 23:
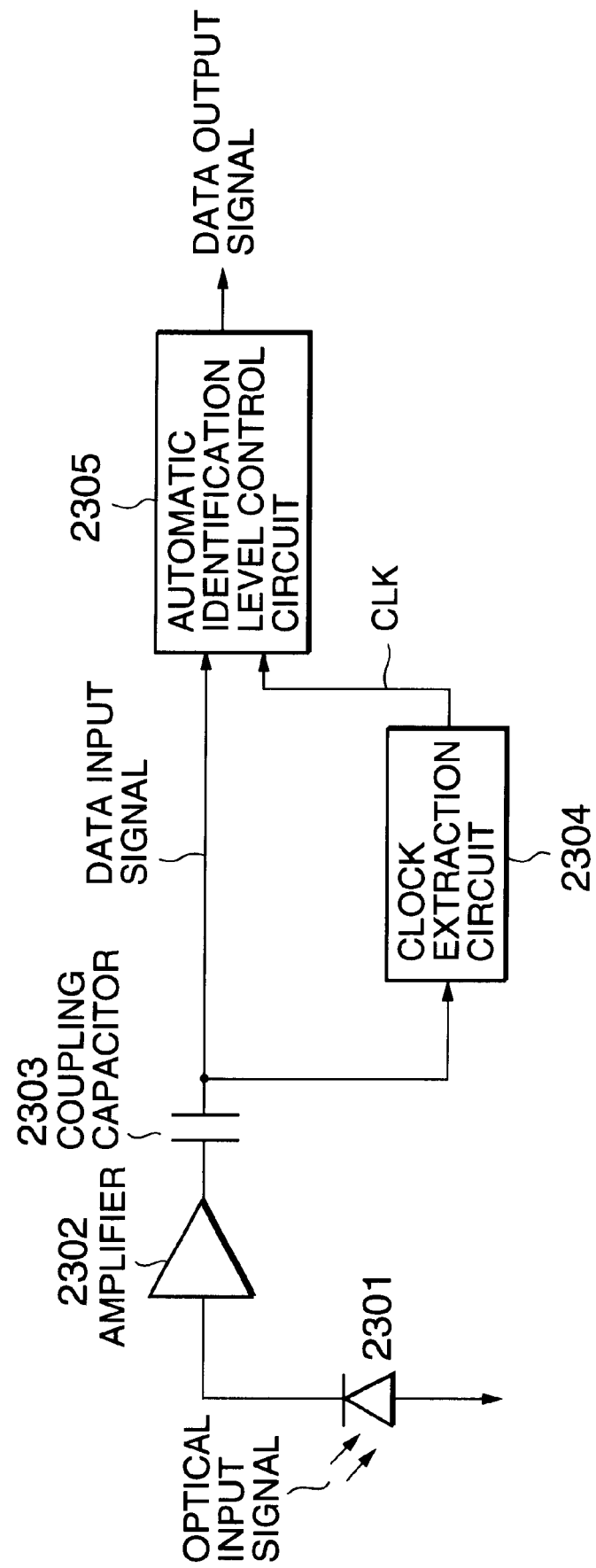
FIG. 23 is a diagram illustrating a structure of an optical receiver circuit according to one embodiment of the present invention.
Figure 24:
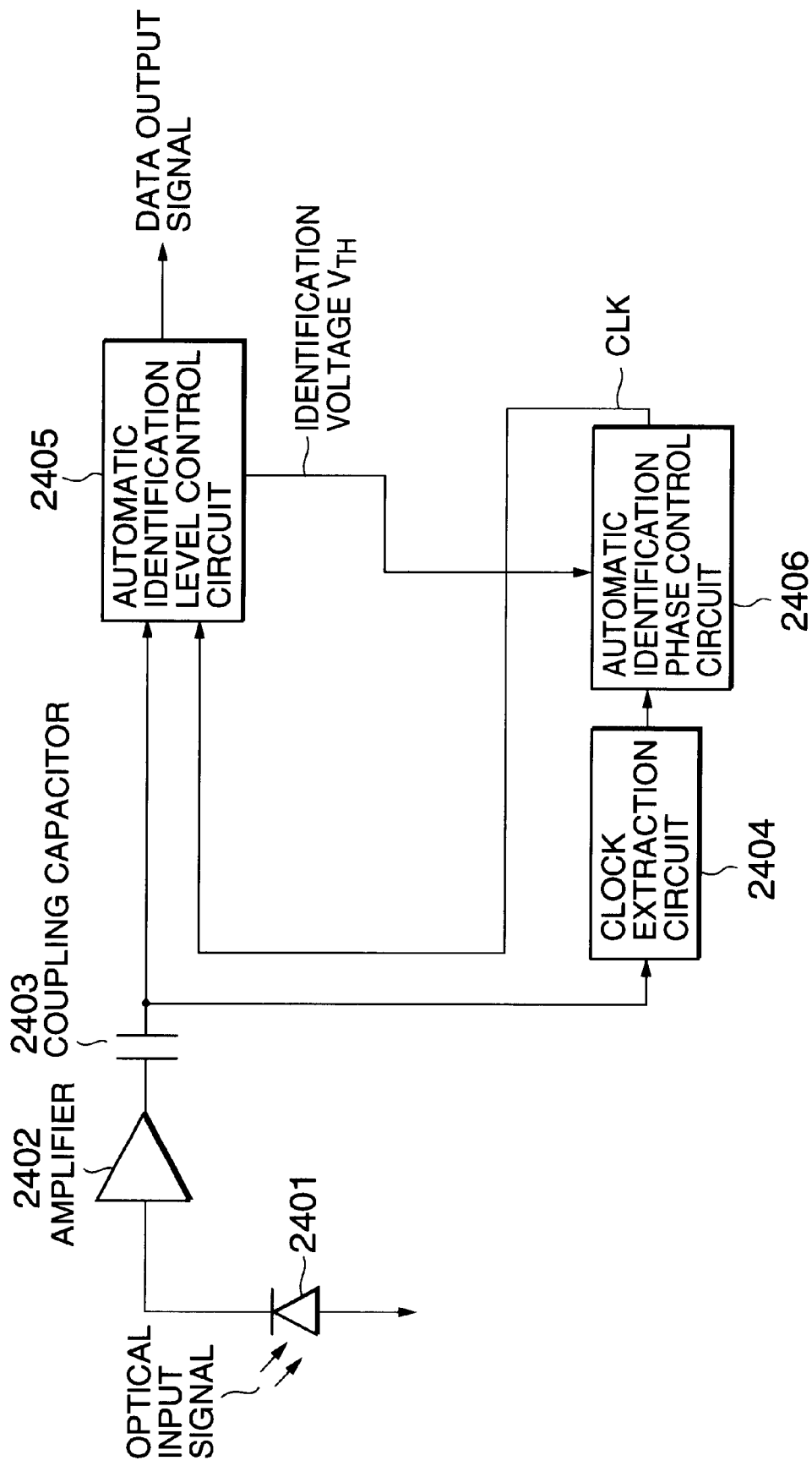
FIG. 24 is a diagram illustrating a structure of an optical receiver circuit according to one embodiment of the present invention.

FIG. 23 is a diagram illustrating an exemplary structure of an optical receiver circuit 12000 according to the thirteenth embodiment of the present invention, incorporating the automatic identification level control circuit of the present invention.

The optical receiver circuit illustrated in FIG. 23 includes a photoelectric converter 2301 for converting an optical signal into an electric signal, an amplifier 2302 for amplifying the converted signal, a coupling capacitor 2303, a clock extraction circuit 2304, and the automatic identification level control circuit 2305.

The output from the amplifier 2302 is provided via the coupling capacitor 2303 to the clock extraction circuit 2304 and the automatic identification level control circuit 2305. The clock extraction circuit 2304 extracts a clock component from a data input signal, and provides the extracted clock component to the automatic identification level control circuit 2305.

Since each of flip-flops in the three-value identification circuit operates as an identification circuit, one of the flip-flops outputting the optimum identification voltage VTH is used as an identification circuit for the main signal in the present embodiment. Conventional PLL circuit is employed as the clock extraction circuit 2304. Either of the automatic identification level control circuit 1 through 4 can be used as the automatic identification level control circuit 2305.

Embodiment 14

Output signal of the clock extraction circuit 2404 is supplied to the automatic identification level control circuit 2405 after its decision phase being optimized by the automatic identification level control circuit 2406. Since each of flip-flops in the three-value identification circuit operates as an identification circuit, one of the flip-flops outputting the optimum identification voltage VTH is used as an identification circuit for the main signal in the present embodiment. The automatic identification level control circuit 2405 identifies the inputted data signal using the optimally adjusted identification voltage VTH.

Conventional PLL circuit is employed as the clock extraction circuit 2404. Either of the automatic identification level control circuit 1 through 4 can be used as the automatic identification level control circuit 2405. Either of the automatic identification phase control circuit 1 or 2 can be used as the automatic identification phase control circuit 2406.

The above embodiments 13 and 14 utilizes one of the flip-flops as an identification circuit for the main signal. With this structure, discrepancy of the optimum identification level outputted from the automatic identification level control circuit, and that of the identification circuit for the main signal can be prevented. Additionally, reduction of circuit size and consumption power can be realized with omission of the identification circuit for the main signal.

Embodiment 15

Figure 25:
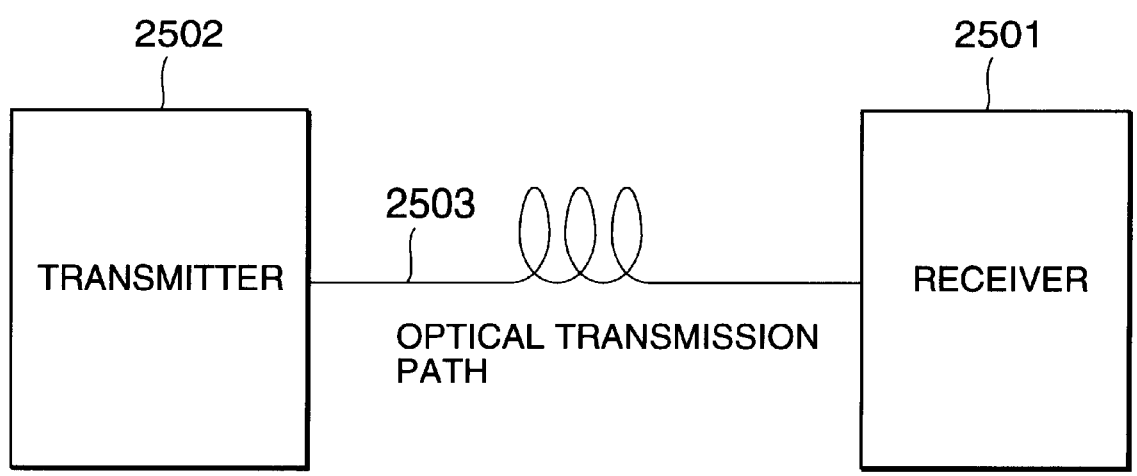
FIG. 25 is a diagram illustrating a structure of an optical communication system according to one embodiment of the present invention.

FIG. 25 is a diagram illustrating a structure of an optical communication system according to the fifteenth embodiment of the present invention.

The optical communication system 13000 includes an optical receiver 2501, an optical transmission path 2503, and an optical transmitter 2502. The optical receiver 2501 incorporates an automatic identification level control circuit, an identification level control method, an automatic identification phase control circuit, an identification phase control method and an optical receiver according to the present invention. In such an optical communication system, an input signal received via the optical transmission path can be optimally identified, thereby realizing a desirable optical signal reception.

As described above, according to the present invention, a plurality of (e.g., three) identification levels are used to monitor fluctuations in the H level and L level of the data input signal. When there is a fluctuation in the signal level, the fluctuation is detected before an error actually occurs, and the identification level VTH is automatically controlled to the optimal value. Not only the respective absolute values of the identification levels, but also the intervals therebetween are controlled. Therefore, even when the amplitude of the input signal varies, it is possible to reliably find an optimal identification level, thereby realizing a stable identification level setting operation. This also applies to an identification phase setting operation.

What is claimed is:

1. An automatic identification level control circuit, comprising:
   an identification circuit having identification levels different from one another for an input data signal; and
   an identification level control circuit for outputting a control signal for adjusting respective absolute values of the identification levels different from one another and an interval therebetween.

2. An automatic identification level control circuit according to claim 1, further comprising a level fluctuation detection circuit for outputting a match determination signal indicating "match" or "mismatch" between outputs from the identification circuit which respectively correspond to two identification levels adjacent to each other in terms of magnitude among the identification levels different from one another.

3. An automatic identification level control circuit, comprising:
   an identification circuit receiving an input data signal and having identification levels different from one another;
   a plurality of exclusive OR circuits each outputting a match determination signal indicating "match" or "mismatch" between outputs from the identification circuit which respectively correspond to two identification levels adjacent to each other in terms of magnitude among the identification levels different from one another; and an identification voltage control circuit for outputting a control signal for adjusting respective absolute values of the identification levels different from one another and an interval therebetween so that the match determination signal indicates "match".

4. An automatic identification level control circuit, comprising:

a plurality of identification circuits receiving an input data signal and having identification levels different from one another;

a plurality of exclusive OR circuits each outputting a match determination signal indicating "match" or "mismatch" between outputs from the identification circuits which respectively correspond to two identification levels adjacent to each other in terms of magnitude among the identification levels different from one another; and an identification voltage control circuit for outputting a control signal for adjusting respective absolute values of the identification levels different from one another and an interval therebetween so that the match determination signal indicates "match".

5. An automatic identification level control circuit according to claim 2, comprising:

a plurality of identification circuits receiving an input data signal and having identification levels different from one another;

a plurality of exclusive OR circuits each outputting a match determination signal indicating "match" or "mismatch" between outputs from the identification circuits which respectively correspond to two identification levels adjacent to each other in terms of magnitude among the identification levels different from one another; and an identification voltage control circuit for outputting a control signal for adjusting a difference between a DC level of the input data signal and one of the identification levels different from one another, and each of the other identification levels so that the match determination signal indicates "match".

6. An automatic identification level control circuit according to claim 2, wherein the identification voltage control circuit comprises:

a charging circuit whose output voltage is incremented when a first one of the match determination signals corresponding to a first one of the identification levels indicates "mismatch";

a discharging circuit whose output voltage is decremented when a second one of the match determination signals corresponding to a second one of the identification levels which is less than the first identification level indicates "mismatch"; and a charging/discharging circuit having a first output whose voltage rapidly decreases when at least one of the first and second match determination signals indicates "mismatch" and gradually increases when both of the first and second match determination signals indicate "match", and a second output whose voltage rapidly increases when at least one of the match determination signals indicates "mismatch" and gradually decreases when both of the match determination signals indicate "match".

7. An automatic identification level control circuit according to claim 2, wherein the identification voltage control circuit comprises:

a discharging circuit whose output voltage is decremented when a first one of the match determination signals corresponding to a first one of the identification levels indicates "mismatch";

a charging circuit whose output voltage is incremented when a second one of the match determination signals corresponding to a second one of the identification levels which is less than the first identification level indicates "mismatch"; and a charging/discharging circuit having a first output whose voltage rapidly decreases when at least one of the first and second match determination signals indicates "mismatch" and gradually increases when both of the first and second match determination signals indicate "match", and a second output whose voltage rapidly increases when at least one of the match determination signals indicates "mismatch" and gradually decreases when both of the match determination signals indicate "match".

8. An automatic identification level control circuit according to claim 2, wherein the identification voltage control circuit comprises:

a first up/down counter which counts up when a first one of the match determination signals corresponding to a first one of the identification levels indicates "mismatch" and counts down when a second one of the match determination signals corresponding to a second one of the identification levels which is less than the first identification level indicates "mismatch";

a timer for providing a predetermined timing;

a second up/down counter which counts down when at least one of the first and second match determination signals indicates "mismatch" and counts up in accordance with the predetermined timing provided by the timer; and a third up/down counter which counts up when at least one of the first and second match determination signals indicates "mismatch" and counts down in accordance with the predetermined timing provided by the timer.

9. An automatic identification level control circuit according to claim 2, wherein the identification voltage control circuit comprises:

a first up/down counter which counts down when a first one of the match determination signals corresponding to a first one of the identification levels indicates "mismatch" and counts up when a second one of the match determination signals corresponding to a second one of the identification levels which is less than the first identification level indicates "mismatch";

a timer for providing a predetermined timing;

a second up/down counter which counts down when at least one of the first and second match determination signals indicates "mismatch" and counts up in accordance with the predetermined timing provided by the timer; and a third up/down counter which counts up when at least one of the first and second match determination signals indicates "mismatch" and counts down in accordance with the predetermined timing provided by the timer.

10. An automatic identification level control circuit according to claim 2, wherein the identification voltage control circuit comprises:

a discharging circuit whose output voltage is decremented when a first one of the match determination signals corresponding to a first one of the identification levels indicates "mismatch"; and a charging circuit whose output voltage is incremented when a second one of the match determination signals corresponding to a second one of the identification levels which is less than the first identification level indicates "mismatch".

11. An automatic identification level control circuit according to claim 2, wherein an average value between identification levels which respectively have a maximum value and a minimum value among the identification levels different from one another is included as an identification level.

12. An automatic identification level control circuit according to claim 2, wherein the automatic identification level control circuit further comprises:
   a pulse width elongation circuit which is inserted between each of the plurality of exclusive OR circuits and the identification voltage control circuit for elongating the match determination signal.

13. An automatic identification phase control circuit, comprising:
   a plurality of identification circuits receiving an input data signal and having identification timings different from one another;
   a plurality of exclusive OR circuits each outputting a match determination signal indicating "match" or "mismatch" between outputs from the identification circuits which respectively correspond to two identification timings adjacent to each other in terms of delay amount among the identification timings different from one another; and
   an identification timing control circuit for outputting a control signal for adjusting respective ones of the identification timings different from one another so that the match determination signal indicates "match".

14. An automatic identification phase control circuit according to claim 13, wherein the identification timing control circuit comprises:
   a discharging circuit whose output voltage is decremented when a first one of the match determination signals corresponding to a first one of the identification timings indicates "mismatch";
   a charging circuit whose output voltage is incremented when a second one of the match determination signals corresponding to a second one of the identification timings which is delayed with respect to the first identification timing indicates "mismatch"; and
   a charging/discharging circuit having a first output whose voltage rapidly decreases when at least one of the first and second match determination signals indicates "mismatch" and gradually increases when both of the match determination signals indicate "match", and a second output whose voltage rapidly increases when at least one of the match determination signals indicates "mismatch" and gradually decreases when both of the match determination signals indicate "match".

15. An automatic identification phase control circuit according to claim 13, wherein the identification timing control circuit comprises:
   a first up/down counter which counts down when a first one of the match determination signals corresponding to a first one of the identification timings indicates "mismatch" and counts up when a second one of the match determination signals corresponding to a second one of the identification timings which is delayed with respect to the first identification timing indicates "mismatch";
   a timer for providing a predetermined timing;
   a second up/down counter which counts down when at least one of the first and second match determination signals indicates "mismatch" and counts up in accordance with the predetermined timing provided by the timer; and
   a third up/down counter which counts up when at least one of the first and second match determination signals indicates "mismatch" and counts down in accordance with the predetermined timing provided by the timer.

16. An automatic identification phase control circuit according to claim 13, wherein the identification timing control circuit comprises:
   a discharging circuit whose output voltage is decremented when a first one of the match determination signals corresponding to a first one of the identification timings indicates "mismatch"; and
   a charging circuit whose output voltage is incremented when a second one of the match determination signals corresponding to a second one of the identification timings which is delayed with respect to the first identification timing indicates "mismatch".

17. An automatic identification phase control circuit according to claim 13, wherein an average value between identification timings which respectively have a maximum delay amount and a minimum delay amount among the identification timings different from one another is included as an identification timing.

18. An automatic identification phase control circuit according to claim 13, wherein the automatic identification phase control circuit further comprises:
   a pulse width elongation circuit which is inserted between each of the plurality of exclusive OR circuits and the identification timing control circuit for elongating the match determination signal.

19. An identification level control method, comprising:
   an identification step of making a comparison in magnitude between an input data signal and each of a plurality of identification levels different from one another;
   a comparison step of making a comparison between comparison results from the identification step which respectively correspond to two of the identification levels different from one another, thereby giving a determination result of "match" or "mismatch"; and
   an identification voltage adjustment step of adjusting respective absolute values of the identification levels and an interval therebetween based on the determination result given in the comparison step.

20. An identification level control method according to claim 19, wherein the number of the identification levels is three.

21. An identification level control method according to claim 19, wherein the identification voltage adjustment step comprises:
   an identification level position adjustment step of shifting, by a same level, respective ones of the plurality of identification levels; and
   an identification level interval adjustment step of adjusting an interval between each pair of the plurality of identification levels.

22. An identification level control method according to claim 19, wherein the identification voltage adjustment step comprises:
   an extreme identification level adjustment step of independently adjusting identification levels which respectively have a maximum value and a minimum value among the plurality of identification levels; and an intermediate identification level setting step of setting a value of each remaining identification level to a value which divides, at a predetermined division ratio, a voltage level range between the identification levels which respectively have the maximum value and the minimum value.

23. An identification level control method according to claim 19, wherein the identification level control method further comprises:

an interval widening step of gradually widening a difference between identification levels which respectively have a maximum value and a minimum value among the identification levels during a time period in which the comparison step is giving a determination result of "match".

24. An identification level control method according to claim 19, comprising:

an identification step of producing an identification output obtained by making a comparison in magnitude between an input digital signal and a predetermined identification level;

an error detection step of detecting an error in a code string which forms the identification output; and an identification level changing step of increasing the identification level when a low level is erroneously identified as a high level, and decreasing the identification level when a high level is erroneously identified as a low level.

25. An identification phase control method, comprising:

an identification step of producing a plurality of identification outputs each obtained by making a comparison in magnitude between an input digital signal and a predetermined identification level with a respective one of a plurality of identification timings different from one another;

a comparison step of making a comparison between identification outputs from the identification step which respectively correspond to two of the plurality of identification timings, thereby giving a determination result of "match" or "mismatch"; and an identification timing adjustment step of adjusting the identification timings based on the determination result given in the comparison step.

26. An identification phase control method according to claim 25, wherein the identification timing adjustment step comprises:

an identification timing position adjustment step of shifting, by a same level, respective ones of the plurality of identification timings; and an identification timing interval adjustment step of adjusting an interval between each pair of the plurality of identification timings.

27. An identification phase control method according to claim 25, wherein the identification timing adjustment step comprises:

an extreme identification timing adjustment step of independently adjusting identification timings which respectively have a maximum delay amount and a minimum delay amount among the plurality of identification timings; and an intermediate identification timing setting step of setting a value of each remaining identification timing to a value which divides, at a predetermined division ratio, an identification timing range between the identification timings which respectively have the maximum delay amount and the minimum delay amount.

28. An identification phase control method according to claim 25, wherein the identification phase control method further comprises:

an interval widening step of gradually widening a difference in delay amount between identification timings which respectively have a maximum delay amount and a minimum delay amount among the identification timings during a time period in which the comparison step is giving a determination result of "match".

29. An optical receiver, comprising:

a photodetector for converting an input optical signal into an electric signal;

an automatic identification level control circuit according to claim 2 which receives the electric signal; and a clock extraction circuit for extracting and outputting a clock signal contained in the electric signal, and providing the extracted clock signal to the automatic identification level control circuit.

30. An optical receiver according to claim 29, wherein the optical receiver further comprises:

an identifier for receiving the electric signal and identifying the received electric signal based on one of the plurality of identification levels which has a value in a vicinity of a median among the plurality of identification levels, and a timing of the clock signal.

31. An optical receiver according to claim 29, wherein the optical receiver further comprises:

a capacitor inserted between the photodetector and the identifier.

32. An optical receiver according to claim 29, wherein the optical receiver further comprises:

an identification phase control circuit, said identification phase control circuit comprising:

a plurality of identification circuits receiving an input data signal and having identification timings different from one another;

a plurality of exclusive OR circuits each outputting a match determination signal indicating "match" or "mismatch" between outputs from the identification circuits which respectively correspond to two identification timings adjacent to each other in terms of delay amount among the identification timings different from one another; and an identification timing control circuit for outputting a control signal for adjusting respective ones of the identification timings different from one another so that the match determination signal indicates "match", and wherein the electric signal is input to the identification phase control circuit, one of the plurality of identification timings which has a delay amount in a vicinity of a median among the plurality of identification timings is provided to the automatic identification level control circuit, and one of the plurality of identification levels which has a value in a vicinity of a median among the plurality of identification levels is provided to the automatic identification phase control circuit.

33. An optical communication system, comprising an optical receiver according to claim 29 and an optical transmitter which is connected to the optical receiver via an optical transmission path.

* * * * *